United States Patent [19]
Yamanashi

[11] Patent Number: 5,331,463
[45] Date of Patent: Jul. 19, 1994

[54] WIDE ANGLE ZOOM LENS SYSTEM
[75] Inventor: Takanori Yamanashi, Tokyo, Japan
[73] Assignee: Olympus Optical Co., Ltd., Tokyo, Japan
[21] Appl. No.: 845,322
[22] Filed: Mar. 3, 1992
[30] Foreign Application Priority Data
 Mar. 4, 1991 [JP] Japan .................. 3-061077
[51] Int. Cl.$^5$ ........................... G02B 15/14
[52] U.S. Cl. ..................... 359/689; 359/686
[58] Field of Search ................... 359/689, 686
[56] References Cited
 U.S. PATENT DOCUMENTS
 4,773,744 9/1988 Yamanashi ............... 359/689
 5,148,321 9/1992 Goto et al. ............... 359/689

FOREIGN PATENT DOCUMENTS
2135312 5/1990 Japan .
2284109 11/1990 Japan .
3208004 9/1991 Japan .

Primary Examiner—Scott J. Sugarman
Attorney, Agent, or Firm—Cushman, Darby & Cushman

[57] ABSTRACT

A wide angle zoom lens system comprising, in order from the object side, a first positive lens unit, a second positive lens unit and a third negative lens unit; and configured so as to perform variation of focal length by varying airspaces reserved between these lens units. The first lens unit consists of a negative front subunit and a rear positive subunit. The zoom lens system has a wide field angle and favorable optical performance.

15 Claims, 27 Drawing Sheets

WIDE ANGLE ZOOM LENS SYSTEM

BACKGROUND OF THE INVENTION a) Field of the Invention

The present invention relates to zoom lens system which has a wide field angle.

b) Description of the Prior Art

In the present days, there is a remarkable trend manufacture, as commercial products developed with a new concept, fully automated cameras which incorporate zoom lens systems having high vari-focal ratios. These zoom lens systems having high vari-focal ratios always have wide field angles or high telephoto ratios.

The conventional zoom lens systems have field angles on the order of $2\omega = 63°$ at wide positions thereof. Further, out of zoom lens systems which have low vari-focal ratios, there are known those which have field angles on the order of $2\omega = 84°$ as exemplified by the zoom lens system disclosed by Japanese Patent Kokai Publication No. Hei 2-284,109.

Further, conventional super wide angle zoom lens systems are known only as interchangeable lens systems which are to be used with single-lens reflex cameras. However, the lens system proposed by Japanese Patent Kokai Publication No. Hei 2-135,312 is a compact zoom lens system which is usable with lens shutter cameras.

Each of the lens systems mentioned above cannot correct aberrations sufficiently favorably since it was obtained simply by modifying an exsisting zoom lens system so as to have a wider field angle. In other words, each of the zoom lens systems mentioned above is a telephoto type zoom lens system which is modified so as to have a shorter focal length or a wider focal length and is insufficient in optical performance thereof.

SUMMARY OF THE INVENTION

A primary object of the present invention is to provide a zoom lens system which comprises three or four lens units, and is configured so as to have wide field angles, large apertures and aberrations corrected favorably by selecting an adequate composition for a first lens unit out of the lens units.

The zoom lens system according to the present invention comprises, in order from the object side, a first lens unit having positive refractive power, a second lens unit having positive refractive power and a third lens unit having negative refractive power; is configured to perform variation of focal length by varying an air-space reserved between the first lens unit and a second lens unit as well as an airspace reserved between the second lens unit and a third lens unit; and is characterized in that the first lens unit consists of a front subunit and a rear subunit, and satisfies the following condition (1):

$$|\phi_f/\phi_1| < 6.0 \quad (1)$$

wherein the reference symbols $\phi_f$ and $\phi_1$ represent refractive power of the front subunit and refractive power of the first lens unit respectively.

The zoom lens system according to the present invention has been obtained by widening the field angle and further improving optical performance of the lens system proposed by Japanese Patent Kokai Publication No. Hei 2-135,312. Speaking concretely, the field angle of the lens system disclosed by the above-mentioned patent has been widened reasonably by shortening a total length of the lens system, selecting the above-described type of zoom lens system which comprises the three lens units, in order from the object side, a first lens unit having positive refractive power, a second lens unit having positive refractive power and a third lens unit having negative refractive power, and composing the first lens unit so as to be suited for widening the field angle of the lens system.

Japanese Patent Kokai Publication No. Hei 3-208,004 proposed a zoom lens system as an improvement of the above-mentioned lens system to facilitate correction of aberrations and widen the field angle thereof by reserving an airspace wider than a certain value between a negative lens component and a positive lens component composing the first lens unit without modifying a composition of this lens unit itself so as to reduce an angle of incidence of the offaxial ray on the second lens unit having positive refractive power.

In contrast, the zoom lens system according to the present invention has a field angle widened by adopting a composition of the first lens unit which is modified so as to be suited for widening the field angle of the preceding lens system as a whole. In other words, the zoom lens system according to the present invention has been obtained not on the basis of a fundamental composition of the above-mentioned zoom lens system having the widened field angles, but on the basis of a fundamental composition of the preceding zoom lens system which has an entire zooming range from a wide position to a tele position or a range of field angles which is convenient for designing a zoom lens system and by shifting the composition toward the wide position.

Speaking concretely, it is possible to obtain, for example, a zoom lens system having a range of focal length f from 28 mm to 105 nun by designing first a zoom lens system having focal length f from 35 nun to 135 mm and equipping this zoom lens system with an attachment lens system for widening field angle by shortening the focal length f $0.8 \times$ as long. When the zoom lens system which is adopted as the basis has a short total length f and a small outside diameter, the addition of the attachment lens system for widening the field angle to the zoom lens system does not enlarge so much the zoom lens system as a whole.

When a single zoom lens system is composed by building the attachment lens system for widening field angle in the zoom lens system adopted as the basis, this attachment lens system can be considered as a lens unit or a lens component which is used for correcting aberrations. That is to say, the attachment lens system which is originally adopted as a separate afocal converter can be regarded as a lens unit or a Lens component which is used for widening the field angle of the zoom lens system.

In the zoom lens system according to the present invention, this lens component is used as a front subunit $L_a$ in the first lens unit and the first lens unit of the zoom lens system adopted as the basis is used as a rear subunit $L_b$ of the first lens unit of the zoom lens system according to the present invention. That is to say, the zoom lens system according to the present invention is of a retrofocus type in which a first lens unit is composed of a wide angle afocal converter (the front subunit) and a positive subunit (the rear subunit), and an airspace reserved between these subunits is narrowed for making the zoom lens system compact.

On the basis of the concept described above, the zoom lens system according to the present invention comprises the three or four lens units as described above.

Further, in order to accomplish the object of the present invention, the zoom lens system according to the present invention is configured so as to satisfy the above-mentioned condition (1).

The object of the present invention is to provide a wide angle zoom lens system which has a field angle 2 ω, for example, of approximately 63° or larger at a wide position thereof as described above. For obtaining the zoom lens system having a wide field angle, the type and composition of the conventional zoom lens system are not modified. When the field angle of the conventional zoom lens system is to be widened without modifying the type thereof, heavier burdens for correction of aberrations, etc. are imposed on the third lens unit, thereby making it impossible to reserve a sufficient back focal length at the wide position of the zoom lens system. Further, a heavier burden for obtaining a required magnification at a tele position is imposed, thereby making it difficult to correct aberrations and obliging to use surfaces which can hardly be manufactured in practice.

Furthermore, aspherical surfaces and graded refractive index lens elements cannot be manufactured easily in practice though it is conceivable to use aspherical surfaces and graded refractive index lens elements for correcting aberrations.

In an attempt to widen a field angle of a zoom lens system, difference in optical path between the paraxial ray and the offaxial ray in the lens system makes it difficult to correct aberrations. In other words, curvature of field, distortion, sagittal flare due to coma, etc. are aggravated as a zoom lens system has a wider field angle.

For the reason described above, the present invention selects a zoom lens system comprising the three lens units as the basis as already described above and adopts a nearly symmetrical composition wherein an aperture stop is arranged in the middle of a second lens unit for obtaining a zoom lens system which is advantageous for correction of the aberrations. Even when the location of the aperture stop is shifted foreward or backward, the fundamental composition of the zoom lens system remains unchanged though the zoom lens system uses a different portion of a light bundle.

After adopting the nearly symmetrical composition which is advantageous for correction of the aberrations, lens components to be used for the zoom lens system are modified so as to be suited for widening the field angle of the conventional zoom lens system. Since the type selected for the zoom lens system according to the present invention permits shortening a back focal length of a lens system, the type makes it possible to shorten a total length and reduce an outside diameter of the lens system. That is to say, the zoom lens system according to the present invention is configured by selecting the composition which is symmetrical with regard to an aperture stop as the basis and using additional lens component(s) which is adopted for shortening the field angle of the conventional zoom lens system. In the zoom lens system according to the present invention, the front subunit serves for compensating for functions of the rear subunit in the first lens unit. Judging from rays passing through the first lens unit and the third lens unit in the zoom lens system according to the present invention, offaxial aberrations are largely influenced by the second lens unit and the third lens unit, whereas axial aberrations, mainly spherical aberration, are greatly influenced by the second lens unit.

Moreover, in order to obtain a zoom lens system having a wide field angle, it is necessary to correct aberrations such as lateral chromatic aberration and distortion having an inflection point which are inherent in a wide angle lens system. That is to say, it is necessary for the zoom lens system according to the present invention to pay attention to compositions of the first lens unit and the third lens unit in order to correct the aberrations inherent in a zoom lens system having a wide field angle and pay attention to composition of the second lens unit in order to obtain a high aperture ratio.

For the wide position of the zoom lens system according to the present invention, it is not advantageous to compose the thrid lens unit of a remarkably increased number of lens components. Since a power distribution which locates a rear principal point after a lens system is selected for the zoom lens system according to the present invention, reservation of a required back focal length is more difficult than the correction of the aberrations for the zoom lens system according to the present invention, thereby lowering freedom of the correction of the aberrations for this zoom lens system. Accordingly, it is preferable to compose the third lens unit of a small number of lens components by using an aspherical surface. The use of the aspherical surface makes it possible to reduce aberrations remaining in the third lens unit itself and correct aberrations of high orders produced in the first lens unit, thereby permitting correcting aberrations with good balance in the zoom lens system as a whole. Further, the use of the aspherical surface makes it possible to reserve a required back focal length reasonably, prevent a rear lens element from having a prolonged diameter, and reduce flare to be produced by an inside surface between a film surface and the rear lens element.

When the points described above are taken into consideration, it is desirable to contrive the first lens unit so as to correct the lateral chromatic aberration and distortion of high orders which are inherent in the wide angle zoom lens system.

In the vicinity of the wide position of the zoom lens system wherein particularly the offaxial ray is high, it is difficult to correct the residual aberrations of high orders by the second lens unit and the third lens unit when the aberrations are not corrected sufficiently in the first lens unit. This fact is apparent from tables of aberration correction coefficients shown below. Checks of balance between aberrations of high orders and aberrations of low orders is especially significant.

Tables 1 and 2 shown below clarify conditions of the aberrations corrected by aberration coefficients which are selected in a first embodiment of the present invention to be described later.

TABLE 1

| | K | SA3 | CMA3 | AST3 | DIS3 | PTZ3 |
|---|---|---|---|---|---|---|
| | | Wide position | | | | |
| | 1 | −0.00001 | −0.00060 | −0.00634 | −0.68756 | −0.01525 |
| Lf | 2 | 0.00393 | −0.00302 | 0.00026 | −0.01807 | 0.07043 |
| | 3 | −0.00388 | −0.00784 | −0.00176 | −0.03585 | −0.05142 |

TABLE 1-continued

Wide position

|   |    | SA3 | CMA3 | AST3 | DIS3 | PTZ3 |
|---|----|---------|---------|---------|---------|---------|
|   | 4  | 0.00011 | 0.00380 | 0.01529 | 0.35334 | 0.01401 |
|   | 5  | 0.00000 | 0.00004 | −0.01272 | −0.66454 | 0.01346 |
|   | 6  | 0.01626 | 0.00255 | 0.00004 | 0.00360 | 0.06885 |
| Lb | 7 | −0.01313 | −0.01030 | −0.00090 | −0.01394 | −0.05240 |
|   | 8  | 0.00030 | 0.00926 | 0.03159 | 0.29145 | −0.00313 |
|   | 9  | −0.00643 | −0.01924 | −0.00639 | −0.06723 | −0.06106 |
|   | 10 | −0.00041 | 0.01420 | −0.05513 | 0.88004 | −0.02043 |
| (1) Lf |  | 0.00016 | −0.00765 | 0.00744 | −0.38814 | 0.01777 |
| Lb |    | −0.00341 | −0.00348 | −0.04350 | 0.42938 | −0.05471 |
| (2) |   | −0.00568 | −0.00308 | 0.11297 | −0.99783 | −0.10148 |
| (3) |   | 0.00164 | 0.00491 | −0.07868 | 0.54632 | 0.13018 |

|   | K  | SA5 | CMA5 | AST5 | DIS5 | PTZ5 | SA7 |
|---|----|---------|---------|---------|---------|---------|---------|
|   | 1  | 0.00000 | 0.00000 | 0.00089 | 0.19925 | 0.00537 | 0.00000 |
| Lf | 2 | 0.00005 | 0.00010 | −0.00019 | −0.04197 | −0.02465 | 0.00000 |
|   | 3  | −0.00006 | −0.00030 | 0.00309 | 0.05851 | 0.02059 | 0.00000 |
|   | 4  | 0.00000 | 0.00001 | −0.00278 | −0.17371 | −0.00664 | 0.00000 |
|   | 5  | 0.00000 | 0.00000 | 0.00140 | 0.29779 | −0.00517 | 0.00000 |
|   | 6  | 0.00045 | 0.00065 | −0.00128 | −0.06874 | −0.03299 | 0.00001 |
| Lb | 7 | −0.00038 | −0.00086 | 0.00385 | 0.06245 | 0.02784 | −0.00001 |
|   | 8  | 0.00001 | 0.00015 | −0.00667 | −0.24618 | −0.00634 | 0.00000 |
|   | 9  | −0.00013 | −0.00038 | 0.00605 | 0.10153 | 0.03024 | 0.00000 |
|   | 10 | −0.00001 | 0.00027 | −0.00851 | −0.05951 | 0.00708 | 0.00000 |
| (1) Lf |  | −0.00001 | −0.00019 | 0.00100 | 0.04207 | −0.00532 | 0.00000 |
| Lb |    | −0.00006 | −0.00017 | −0.00516 | 0.08734 | 0.02066 | 0.00000 |
| (2) |   | 0.00215 | 0.00210 | 0.02325 | 0.11002 | 0.04238 | 0.00044 |
| (3) |   | −0.00011 | −0.00182 | −0.01764 | −0.23535 | −0.04339 | −0.00001 |

TABLE 2

Tele position

|   | K  | SA3 | CMA3 | AST3 | DIS3 | PTZ3 |
|---|----|---------|---------|---------|---------|---------|
|   | 1  | −0.00012 | −0.00129 | −0.00153 | −0.02522 | −0.00533 |
|   | 2  | 0.07407 | −0.15959 | 0.03821 | −0.04511 | 0.02461 |
|   | 3  | −0.07297 | 0.12950 | −0.02554 | 0.02573 | −0.01796 |
|   | 4  | 0.00198 | 0.00570 | 0.00182 | 0.00645 | 0.00489 |
|   | 5  | 0.00000 | 0.00011 | −0.00449 | −0.02568 | 0.00470 |
|   | 6  | 0.30610 | −0.62100 | 0.13998 | −0.11093 | 0.02405 |
|   | 7  | −0.24715 | 0.48029 | −0.10370 | 0.07903 | −0.01831 |
|   | 8  | 0.00567 | 0.01211 | 0.00287 | 0.00127 | −0.00109 |
|   | 9  | −0.12109 | 0.19893 | −0.03631 | 0.03156 | −0.02133 |
|   | 10 | 0.00765 | 0.05210 | −0.03943 | 0.10570 | −0.00714 |
| (1) Lf |  | 0.00296 | −0.02568 | 0.01292 | −0.03815 | 0.00621 |
| Lb |    | −0.06413 | 0.12254 | −0.04108 | 0.08095 | −0.01912 |
| (2) |   | −0.04759 | −0.01905 | 0.04255 | −0.06852 | −0.03545 |
| (3) |   | 0.10867 | −0.07190 | −0.01371 | 0.05029 | 0.04548 |

|   | K  | SA5 | CMA5 | AST5 | DIS5 | PTZ5 | SA7 |
|---|----|---------|---------|---------|---------|---------|---------|
|   | 1  | 0.00000 | 0.00000 | 0.00003 | 0.00058 | 0.00013 | 0.00000 |
| Lf | 2 | 0.00378 | −0.01177 | 0.00036 | 0.00004 | −0.00079 | 0.00023 |
|   | 3  | −0.00467 | 0.01264 | −0.00018 | −0.00005 | 0.00061 | −0.00035 |
|   | 4  | 0.00003 | −0.00003 | 0.00001 | −0.00043 | −0.00024 | 0.00000 |
|   | 5  | 0.00000 | −0.00002 | −0.00015 | 0.00139 | −0.00003 | 0.00000 |
|   | 6  | 0.03670 | −0.11819 | 0.00751 | −0.00661 | −0.00013 | 0.00506 |
| Lb | 7 | −0.03092 | 0.09610 | −0.00552 | 0.00477 | 0.00010 | −0.00437 |
|   | 8  | 0.00066 | −0.00059 | −0.00011 | −0.00036 | −0.00021 | 0.00008 |
|   | 9  | −0.01079 | 0.03259 | −0.00184 | 0.00146 | 0.00039 | −0.00114 |
|   | 10 | −0.00095 | 0.00630 | −0.00199 | 0.00210 | 0.00044 | −0.00014 |
| (1) Lf |  | −0.00086 | 0.00083 | 0.00021 | 0.00014 | −0.00028 | −0.00012 |
| Lb |    | −0.00530 | 0.01618 | −0.00209 | 0.00276 | 0.00056 | −0.00052 |
| (2) |   | 0.06153 | 0.00426 | 0.00182 | −0.00011 | 0.00112 | 0.03223 |
| (3) |   | −0.05301 | −0.04412 | −0.00037 | 0.00050 | −0.00148 | −0.03257 |
| TOTAL |  | 0.00235 | −0.02284 | −0.00043 | 0.00329 | −0.00008 | −0.00097 |

Table 1 lists values of the aberrations at the wide position of the zoom lens system according to the present invention, whereas Table 2 lists values of the aberrations at the tele position thereof. Further, aberration coefficients of the lens units other than the first lens unit are listed as total sums of aberration coefficients characteristic of surfaces of these lens units. The reference symbols k(1–4) and $L_f$ represent the front subunit, the reference symbols k(5–10) and $L_b$ designate the rear subunit, and the reference numerals (2) and (3) denote the second lens unit and the third lens unit respectively.

It will be understood from the tables shown above that spherical aberration which is one of the axial aberrations is little in the first lens unit.

On the other hand, it will be understood that the astigmatism and distortion which are the offaxial aberrations are corrected favorably in the first lens unit. That is to say, the front subunit effectively overcorrects the astigmatism which is to be undercorrected by the rear subunit and undercorrects the distortion which is to be overcorrected by the rear subunit in the first embodiment of the present invention. This fact or the compensation of the functions of the rear subunit by the front subunit can be seen from FIG. 3 illustrating a diagram wherein an offaxial ray which is incident at a large angle on the front subunit has a small angle of incidence on the rear subunit.

Considering the fact that it is difficult to widen a field angle of a zoom lens system by using the composition of the first lens unit of the conventional zoom lens system, the present invention has modified the angle of incidence on the first lens unit to a value which facilitates the correction of the aberrations by arranging additional lens component(s) having weak refractive power before the first lens unit so as to widen the field angle of the conventional zoom lens system as described above. The additional lens component(s) and the first lens unit of the conventional zoom lens system are used as the front subunit and the rear subunit respectively which compose the new first lens unit to be used in the zoom lens system according to the present invention. Accordingly, the new first lens unit has the composition which facilitates the correction of the aberrations even when a zoom lens system has a widened field angle, and makes it possible to obtain a zoom lens system which has a wide field angle and favorably corrected aberrations. The front subunit of the first lens unit having the new composition may be composed of a single negative lens component, but it will be effective for correcting the aberrations more favorably to compose the front subunit of a negative lens component and a positive lens component.

On the other hand, in order that the first lens unit has a small outside diameter and that the zoom lens system has an entrance pupil at a location which is not too far from the first surface thereof, it is desirable to configure the zoom lens system according to the present invention so as to satisfy the conditions to be described below.

It is desirable that the front subunit of the first lens unit comprises at least one negative lens component and that the rear subunit comprises at least one positive lens component and one negative lens component.

Further, it is desirable that the zoom lens system according to the present invention satisfies the conditions (2) through (4) mentioned below:

$$0.1 < \phi_1/\phi_W < 1.25 \qquad (2)$$

$$1.1 < \phi_{12W}/\phi_W < 3.0 \qquad (3)$$

$$1.5 < \beta_{3T}/\beta_{3W} < 4.0 \qquad (4)$$

wherein the reference symbol $\phi_W$ represents refractive power of the zoom lens system as a whole at the wide position thereof, the reference symbol $\phi_1$ designates refractive power of the first lens unit, the reference symbol $\phi_{12W}$ denotes total refractive power of the first lens unit and the second lens unit at the wide position, and the reference symbols $\beta_{3W}$ and $\beta_{3T}$ represent magnifications of the third lens unit at the wide position and the tele position respectively.

The condition (2) defines the refractive power of the first lens unit. If the upper limit of the condition (2) is exceeded, it will be difficult to correct the aberrations. If the lower limit of the condition (2) is exceeded, it will be necessary to move the lens units for long distances for zooming, thereby producing a disadvantage for compact design of the zoom lens system according to the present invention.

The condition (3) is required for shortening total lengths of the first lens unit and the second lens unit, and determining refractive power which is desirable for the favorable correction of the aberrations. If the upper limit of the condition (3) is exceeded, it will be impossible to obtain sufficiently favorable optical performance of the zoom lens system according to the present invention though the lens system can be made compact. If the lower limit of the condition (3) is exceeded, the zoom lens system according to the present invention will be enlarged.

The condition (4) relates to a vari-focal ratio. If the lower limit of the condition (4) is exceeded, it will practically be impossible to obtain a zoom lens system which has a high vari-focal ratio.

Further, when attention is paid to an axial ray and an offaxial ray, as considered according to the paraxial theory, which pass through the first lens unit, it is desirable that the zoom lens system according to the present invention satisfies the following conditions (5) and (6):

$$0.5 < h_B/h_F < 1.5 \qquad (5)$$

$$0.2 < AB/AF < 2.0 \qquad (6)$$

wherein the reference symbol $h_F$ represents a height of the axial ray incident on the front subunit of the first lens unit at the wide position, the reference symbol $h_B$ designates a height of the offaxial ray incident on the rear subunit of the first lens unit at the wide position, the reference symbol AF denotes a height of the axial ray incident on the front subunit of the first lens unit at the wide position and the reference symbol AB represents a height of the offaxial ray incident on the rear sub-unit of the first lens unit at the wide position.

The condition (5) means that weak refractive power is to be imparted to the front subunit of the first lens unit even when the field angle of the zoom lens system is to be widened by designing the first lens unit as an inverted telephoto type with negative refractive power imparted to the front subunit or when positive refractive power is imparted to the front subunit.

If the lower limit of the condition (5) is exceeded, the front subunit will have a weak function for correcting the offaxial aberrations at the wide position. If the upper limit of the condition (5) is exceeded, the front subunit will have too weak refractive power and must comprise an increased number of lens components for correcting the aberrations, thereby enlarging the zoom lens system as a whole.

The condition (6) has significance which is similar to that of the condition (5). If the lower limit of the condition (6) is exceeded, the front subunit will have strong refractive power. If the upper limit of the condition (6) is exceeded, it will be difficult to correct the aberrations at the wide position.

The conditions (5) and (6) are to be satisfied for facilitating the correction of the aberrations by narrowing the angle of incidence of the offaxial ray on the first lens unit. In other words, when these conditions are not satisfied, the aberration correcting functions will be effective so far as the zoom lens system has a field angle at the wide position which is close to that of an ordinary telephoto type lens system but the offaxial aberrations will be corrected with lens effect at the super wide angle of the zoom lens system according to the present invention.

Though description has been made above of a concept for composing the zoom lens system which consists of the three lens units, this concept is applicable also to a zoom lens system which comprises four lens units. That is to say, it is possible to obtain a zoom lens system accomplishing the object of the present invention by: composing the zoom lens system, in order from the object side, of a first lens unit having positive refractive power, a second lens unit having positive refractive power, a third lens unit having positive refractive power and a fourth lens unit having negative refractive power as shown in FIG. 2; configuring the lens system so as to perform variation of focal length by varying an airspace reserved between the first lens unit and the second lens unit, an airspace reserved between the second lens unit and the third lens unit, and an airspace reserved between the third lens unit and the fourth lens unit; and composing the first lens unit of a front subunit and a rear subunit so as to permit widening a field angle of the lens system and satisfy the condition (1).

Refracting conditions of the thin lens component and thick lens components arranged in the first lens unit are illustrated in FIGS. 4, 5 and FIGS. 6 and 7 respectively.

DETAILED DESCRIPTION OF THE PREFERRED EMBODIMENTS

Figure 1:
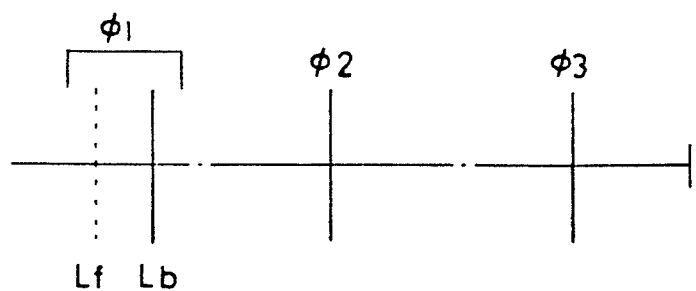
FIG. 1 shows a diagram illustrating a fundamental composition of the zoom lens system according to the present invention which comprises three lens units.
Figure 2:
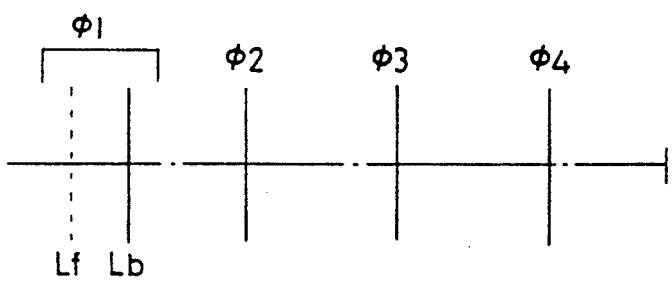
FIG. 2 shows a diagram illustrating a fundamental composition of the zoom lens system according to the present invention which comprises four lens units.
Figure 3:
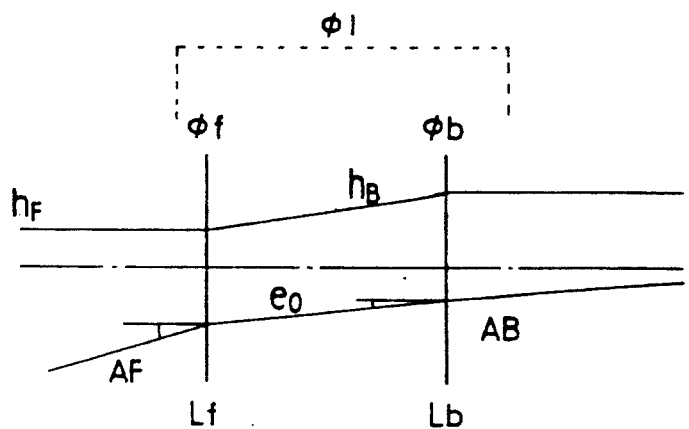
FIG. 3 shows a diagram illustrating conditions of incidence of the offaxial ray on the front subunit and the rear subunit of the first lens unit arranged in the zoom lens system according to the present invention.
Figure 4:
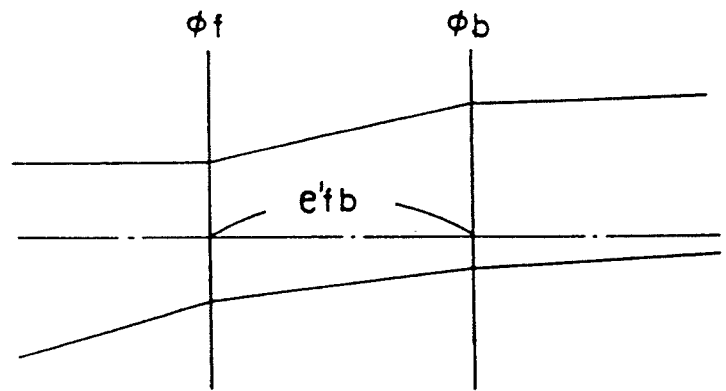
FIG. 4 shows a diagram illustrating conditions of rays, as considered according to the paraxial theory, refracted by the first lens unit at the wide position.
Figure 5:
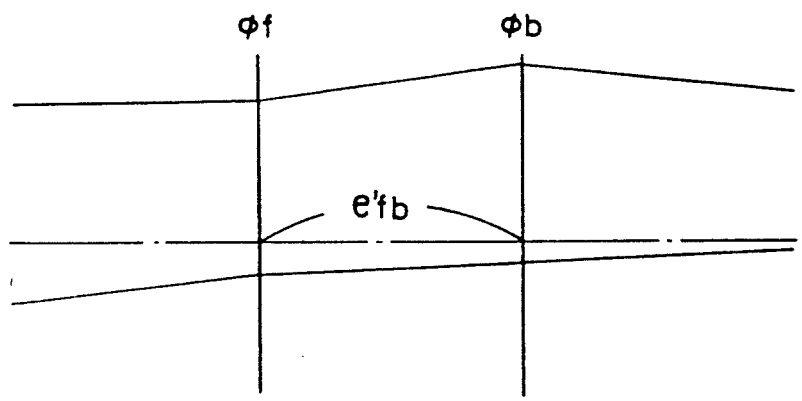
FIG. 5 shows a diagram illustrating conditions of the rays, as considered according to the paraxial theory, refracted by the first lens unit at the tele position.
Figure 6:
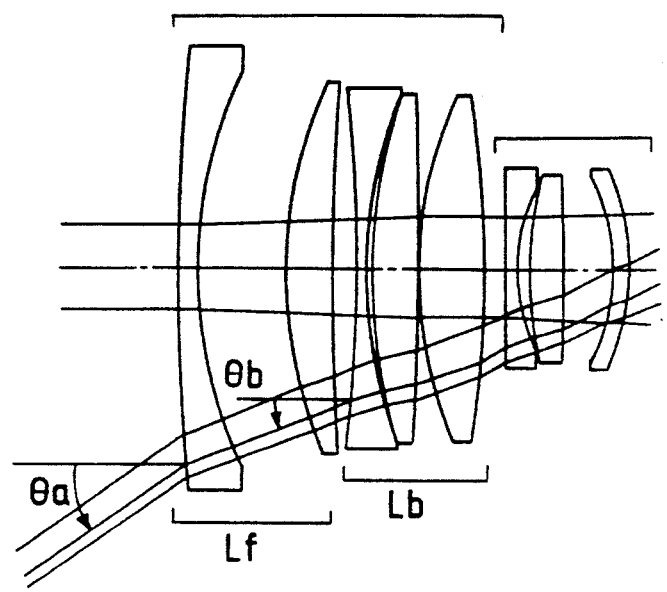
FIG. 6 shows a diagram illustrating conditions of rays refracted by the thick lens components of the first lens unit at the wide position.
Figure 7:
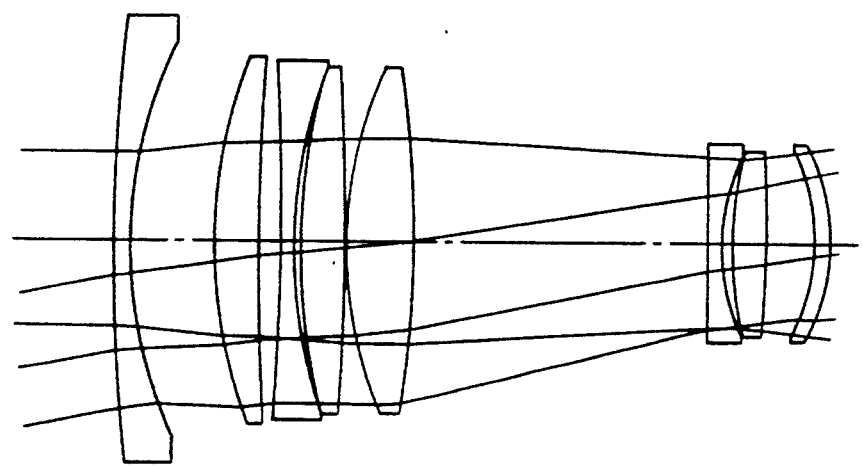
FIG. 7 shows a diagram illustrating conditions of rays refracted by the thick lens components of the first lens unit at the tele position.

Now, the zoom lens system according to the present invention will be described more detailedly below with reference to the preferred embodiments illustrated in the accompanying drawings and given in a form of the following numerical data:

Embodiment 1

$f = 28.90 \sim 102.00$ mm, F/4.5~F/7.625
$2\omega = 73.64° \sim 23.94°$ $r_1 = 160.7804$
$\quad d_1 = 1.2000 \quad n_1 = 1.74100 \quad \nu_1 = 52.68$
$r_2 = 34.8076$
$\quad d_2 = 6.9850$
$r_3 = 38.8887$
$\quad d_3 = 3.3406 \quad n_2 = 1.53172 \quad \nu_2 = 48.90$
$r_4 = 142.7690$
$\quad d_4 = D1$
$r_5 = -194.6240$
$\quad d_5 = 1.0000 \quad n_3 = 1.83400 \quad \nu_3 = 37.16$
$r_6 = 38.0459$
$\quad d_6 = 0.3520$
$r_7 = 43.6383$
$\quad d_7 = 3.4187 \quad n_4 = 1.65844 \quad \nu_4 = 50.86$
$r_8 = -730.7292$
$\quad d_8 = 0.1500$
$r_9 = 32.2002$
$\quad d_9 = 5.2460 \quad n_5 = 1.51823 \quad \nu_5 = 58.96$
$r_{10} = -96.2536$
$\quad d_{10} = D2$
$r_{11} = -498.7110$
$\quad d_{11} = 1.0000 \quad n_6 = 1.78590 \quad \nu_6 = 44.18$
$r_{12} = 15.0840$
$\quad d_{12} = 0.8410$
$r_{13} = 24.1630$
$\quad d_{13} = 2.7640 \quad n_7 = 1.78470 \quad \nu_7 = 26.22$
$r_{14} = -102.9802$
$\quad d_{14} = 3.9120$
$r_{15} = -14.3361$
$\quad d_{15} = 1.1100 \quad n_8 = 1.65830 \quad \nu_8 = 53.44$
$r_{16} = -16.3753$
$\quad d_{16} = 4.9610$
$r_{17} = \infty$ (stop)
$\quad d_{17} = 3.6000$
$r_{18} = -79.9489$
$\quad d_{18} = 2.1300 \quad n_9 = 1.66680 \quad \nu_9 = 33.04$
$r_{19} = -51.9241$
$\quad d_{19} = 0.5000$
$r_{20} = -555.5860$
$\quad d_{20} = 3.0490 \quad n_{10} = 1.51454 \quad \nu_{10} = 54.69$
$r_{21} = -26.8298$
$\quad d_{21} = 0.1200$
$r_{22} = 103.1734$
$\quad d_{22} = 0.6500 \quad n_{11} = 1.80518 \quad \nu_{11} = 25.43$
$r_{23} = 17.2071$
$\quad d_{23} = 5.4150 \quad n_{12} = 1.60729 \quad \nu_{12} = 59.38$
$r_{24} = -26.0457$
$\quad d_{24} = 1.2500$
$r_{25} = -21.6894$
$\quad d_{25} = 0.8780 \quad n_{13} = 1.77250 \quad \nu_{13} = 49.66$
$r_{26} = -22.7792$
$\quad d_{26} = D3$
$r_{27} = -54.8870$
$\quad d_{27} = 3.3170 \quad n_{14} = 1.78472 \quad \nu_{14} = 25.71$
$r_{28} = -22.2644$
$\quad d_{28} = 2.4970$
$r_{29} = -15.6872$ (aspherical surface)
$\quad d_{29} = 0.3600 \quad n_{15} = 1.52492 \quad \nu_{15} = 51.77$
$r_{30} = -16.8658$
$\quad d_{30} = 1.3200 \quad n_{16} = 1.77250 \quad \nu_{16} = 49.66$
$r_{31} = 62.5760$ aspherical surface coefficient
$P = 1.0000, E = 0.30618 \times 10^{-4}, F = 0.10777 \times 10^{-6}$
$G = -0.18514 \times 10^{-9}, H = 0.20423 \times 10^{-11}$

| | f | | |
|---|---|---|---|
| | 28.90 | 54.44 | 102.00 |
| D1 | 1.750 | 1.750 | 1.750 |
| D2 | 1.500 | 16.298 | 22.421 |
| D3 | 15.852 | 7.073 | 1.530 |

$|\phi_f/\phi_1| = 0.65194, \phi_1/\phi_W = 0.246, \phi_{12W}/\phi_W = 1.330$
$h_B/h_F = 1.1256, AB/AF = 0.8117, \beta_{3T}/\beta_{3W} = 3.0$ Embodiment 2

$f = 28.92 \sim 102.02$ mm, F/4.5~F/7.625,
$2\omega = 73.6° \sim 23.94°$ $r_1 = -82.5283$
$\quad d_1 = 1.2500 \quad n_1 = 1.74100 \quad \nu_1 = 52.68$
$r_2 = 8479.1527$
$\quad d_2 = 1.0288$
$r_3 = 109.7348$
$\quad d_3 = 2.2603 \quad n_2 = 1.53172 \quad \nu_2 = 48.90$
$r_4 = -234.4198$
$\quad d_4 = 0.7500$
$r_5 = -104.1899$
$\quad d_5 = 0.8500 \quad n_3 = 1.83400 \quad \nu_3 = 37.16$
$r_6 = 35.3417$
$\quad d_6 = 0.3000$
$r_7 = 39.3253$
$\quad d_7 = 4.5192 \quad n_4 = 1.65844 \quad \nu_4 = 50.86$
$r_8 = -20126.4985$
$\quad d_8 = 0.1200$
$r_9 = 38.2462$
$\quad d_9 = 5.5542 \quad n_5 = 1.65830 \quad \nu_5 = 53.44$
$r_{10} = -81.9930$
$\quad d_{10} = D1$
$r_{11} = 161.3593$
$\quad d_{11} = 0.5000 \quad n_6 = 1.78590 \quad \nu_6 = 44.18$
$r_{12} = 12.1902$
$\quad d_{12} = 0.7721$
$r_{13} = 20.1078$
$\quad d_{13} = 3.1941 \quad n_7 = 1.78470 \quad \nu_7 = 26.22$
$r_{14} = -324.9518$
$\quad d_{14} = 2.9127$
$r_{15} = -12.2940$
$\quad d_{15} = 0.6569 \quad n_8 = 1.65830 \quad \nu_8 = 53.44$
$r_{16} = -14.2480$
$\quad d_{16} = 2.5569$
$r_{17} = \infty$ (stop)
$\quad d_{17} = 3.4906$
$r_{18} = -39.4065$ -continued

| | | |
|---|---|---|
| $d_{18} = 1.9818$ | $n_9 = 1.59270$ | $\nu_9 = 35.29$ |
| $r_{19} = -23.5086$ | | |
| $d_{19} = 1.0128$ | | |
| $r_{20} = -77.1442$ | | |
| $d_{20} = 2.2237$ | $n_{10} = 1.50137$ | $\nu_{10} = 56.40$ |
| $r_{21} = -27.3780$ | | |
| $d_{21} = 0.1200$ | | |
| $r_{22} = 71.2472$ | | |
| $d_{22} = 0.8500$ | $n_{11} = 1.84666$ | $\nu_{11} = 23.78$ |
| $r_{23} = 17.8516$ | | |
| $d_{23} = 4.0993$ | $n_{12} = 1.60881$ | $\nu_{12} = 58.94$ |
| $r_{24} = -19.8521$ | | |
| $d_{24} = 0.8500$ | | |
| $r_{25} = -20.0533$ | | |
| $d_{25} = 1.5717$ | $n_{13} = 1.77250$ | $\nu_{13} = 49.66$ |
| $r_{26} = -21.5906$ | | |
| $d_{26} = D2$ | | |
| $r_{27} = -49.9729$ | | |
| $d_{27} = 3.4179$ | $n_{14} = 1.78472$ | $\nu_{14} = 25.71$ |
| $r_{28} = -20.4693$ | | |
| $d_{28} = 2.6530$ | | |
| $r_{29} = -13.9632$ (aspherical surface) | | |
| $d_{29} = 0.1000$ | $n_{15} = 1.52492$ | $\nu_{15} = 51.77$ |
| $r_{30} = -14.0500$ | | |
| $d_{30} = 0.9444$ | $n_{16} = 1.78590$ | $\nu_{16} = 44.18$ |
| $r_{31} = 57.0622$ | | | aspherical surface coefficient
P = 1.0000, E = 0.46567 × 10$^{-4}$, F = 0.16608 × 10$^{-6}$
G = −0.40245 × 10$^{-9}$, H = 0.76140 × 10$^{-11}$

| f | 28.92 | 54.39 | 102.02 |
|---|---|---|---|
| D1 | 1.250 | 15.540 | 20.970 |
| D2 | 12.853 | 5.873 | 1.207 |

$|\phi_F/\phi_1| = 0.17379$, $\phi_1/\phi_W = 0.304$, $\phi_{12W}/\phi_W = 1.404$
$h_B/h_F = 1.0233$, AB/AF = 0.9179, $\beta_{3T}/\beta_{3W} = 3.329$ Embodiment 3
f = 24.50~76.49 mm, F/4.5~F/7.5,
2ω = 82.88°~31.58°

| | | |
|---|---|---|
| $r_1 = 96.5532$ | | |
| $d_1 = 1.2000$ | $n_1 = 1.69350$ | $\nu_1 = 53.23$ |
| $r_2 = 27.7448$ | | |
| $d_2 = 11.6550$ | | |
| $r_3 = -91.4665$ | | |
| $d_3 = 1.2066$ | $n_2 = 1.78470$ | $\nu_2 = 26.22$ |
| $r_4 = -303.5278$ | | |
| $d_4 = 0.1500$ | | |
| $r_5 = 39.5053$ | | |
| $d_5 = 3.0500$ | $n_3 = 1.58913$ | $\nu_3 = 60.97$ |
| $r_6 = 72.7943$ | | |
| $d_6 = 0.1500$ | | |
| $r_7 = 37.1151$ | | |
| $d_7 = 5.0200$ | $n_4 = 1.60311$ | $\nu_4 = 60.70$ |
| $r_8 = -206.3245$ | | |
| $d_8 = D1$ | | |
| $r_9 = 57.4357$ | | |
| $d_9 = 1.0000$ | $n_5 = 1.67790$ | $\nu_5 = 55.33$ |
| $r_{10} = 16.3022$ (aspherical surface) | | |
| $d_{10} = 1.5109$ | | |
| $r_{11} = 36.9971$ | | |
| $d_{11} = 2.7640$ | $n_6 = 1.72151$ | $\nu_6 = 29.24$ |
| $r_{12} = -33.4657$ | | |
| $d_{12} = 1.1015$ | | |
| $r_{13} = -23.8559$ | | |
| $d_{13} = 1.1100$ | $n_7 = 1.83400$ | $\nu_7 = 37.16$ |
| $r_{14} = -125.8813$ | | |
| $d_{14} = 4.7035$ | | |
| $r_{15} = \infty$ (stop) | | |
| $d_{15} = 3.4988$ | | |
| $r_{16} = -21.5971$ | | |
| $d_{16} = 2.1300$ | $n_8 = 1.46450$ | $\nu_8 = 65.94$ |
| $r_{17} = -22.7796$ | | |
| $d_{17} = 3.9083$ | | |
| $r_{18} = -54.9728$ | | |
| $d_{18} = 2.5000$ | $n_9 = 1.51821$ | $\nu_9 = 65.04$ |
| $r_{19} = -18.0505$ | | |
| $d_{19} = 0.1200$ | | |
| $r_{20} = 52.5661$ | | |
| $d_{20} = 0.8500$ | $n_{10} = 1.84666$ | $\nu_{10} = 23.78$ |
| $r_{21} = 21.2304$ | | |
| $d_{21} = 4.0000$ | $n_{11} = 1.56873$ | $\nu_{11} = 63.16$ |
| $r_{22} = -58.4819$ | | |
| $d_{22} = 0.8950$ | | |
| $r_{23} = 70.2181$ | | |

-continued

| | | |
|---|---|---|
| $d_{23} = 2.5000$ | $n_{12} = 1.77250$ | $\nu_{12} = 49.66$ |
| $r_{24} = -204.8691$ | | |
| $d_{24} = D2$ | | |
| $r_{25} = -76.9580$ | | |
| $d_{25} = 3.3170$ | $n_{13} = 1.74000$ | $\nu_{13} = 28.29$ |
| $r_{26} = -25.1526$ | | |
| $d_{26} = 1.2613$ | | |
| $r_{27} = -19.5931$ (aspherical surface) | | |
| $d_{27} = 0.3600$ | $n_{14} = 1.52492$ | $\nu_{14} = 51.77$ |
| $r_{28} = -23.2468$ | | |
| $d_{28} = 1.3200$ | $n_{15} = 1.77250$ | $\nu_{15} = 49.66$ |
| $r_{29} = 35.1917$ | | | aspherical surface coefficient
(10th surface) P = 1.0000, E = 0.15173 × 10$^{-4}$
F = 0.18351 × 10$^{-6}$, G = −0.10833 × 10$^{-8}$
H = 0.28490 × 10$^{-10}$
(27th surface) P = 1.0000, E = 0.22735 × 10$^{-4}$
F = 0.29706 × 10$^{-7}$, G = −0.30210 × 10$^{-9}$
H = 0.83428 × 10$^{-12}$

| f | 24.50 | 45.02 | 76.49 |
|---|---|---|---|
| D1 | 0.850 | 16.915 | 22.361 |
| D2 | 12.830 | 5.031 | 0.510 |

$|\phi_F/\phi_1| = 2.13856$, $\phi_1/\phi_W = 0.175$, $\phi_{12W}/\phi_W = 1.365$
$h_B/h_F = 1.2347$, AB/AF = 0.5986, $\beta_{3T}/\beta_{3W} = 2.727$ Embodiment 4
f = 29.01~105.43 mm, F/4~F/7.65,
2ω = 73.42°~23.2°

| | | |
|---|---|---|
| $r_1 = 123.2807$ | | |
| $d_1 = 1.2000$ | $n_1 = 1.69680$ | $\nu_1 = 55.52$ |
| $r_2 = 28.1453$ | | |
| $d_2 = 7.0560$ | | |
| $r_3 = 31.7325$ | | |
| $d_3 = 5.4876$ | $n_2 = 1.53172$ | $\nu_2 = 48.90$ |
| $r_4 = 302.3165$ | | |
| $d_4 = D1$ | | |
| $r_5 = -125.1445$ | | |
| $d_5 = 1.0000$ | $n_3 = 1.83400$ | $\nu_3 = 37.16$ |
| $r_6 = 33.3387$ | | |
| $d_6 = 0.6923$ | | |
| $r_7 = 40.6740$ | | |
| $d_7 = 3.6156$ | $n_4 = 1.65844$ | $\nu_4 = 50.86$ |
| $r_8 = -1157.9848$ | | |
| $d_8 = 0.1500$ | | |
| $r_9 = 32.3632$ | | |
| $d_9 = 5.6348$ | $n_5 = 1.51823$ | $\nu_5 = 58.96$ |
| $r_{10} = -60.9035$ | | |
| $d_{10} = D2$ | | |
| $r_{11} = -87.8043$ | | |
| $d_{11} = 1.0000$ | $n_6 = 1.78590$ | $\nu_6 = 44.18$ |
| $r_{12} = 16.2024$ | | |
| $d_{12} = 0.9097$ | | |
| $r_{13} = 31.3832$ | | |
| $d_{13} = 2.9131$ | $n_7 = 1.78470$ | $\nu_7 = 26.22$ |
| $r_{14} = -49.7711$ | | |
| $d_{14} = 3.5341$ | | |
| $r_{15} = -18.0019$ | | |
| $d_{15} = 1.2081$ | $n_8 = 1.65830$ | $\nu_8 = 53.44$ |
| $r_{16} = -22.3951$ | | |
| $d_{16} = 4.7231$ | | |
| $r_{17} = \infty$ (stop) | | |
| $d_{17} = 3.4676$ | | |
| $r_{18} = -115.0000$ | | |
| $d_{18} = 2.1300$ | $n_9 = 1.68893$ | $\nu_9 = 31.08$ |
| $r_{19} = -64.5600$ | | |
| $d_{19} = 0.5000$ | | |
| $r_{20} = 484.4333$ | | |
| $d_{20} = 3.3939$ | $n_{10} = 1.54739$ | $\nu_{10} = 53.55$ |
| $r_{21} = -26.1713$ | | |
| $d_{21} = 0.5903$ | | |
| $r_{22} = 146.1389$ | | |
| $d_{22} = 0.4350$ | $n_{11} = 1.78472$ | $\nu_{11} = 25.71$ |
| $r_{23} = 17.3114$ | | |
| $d_{23} = 5.4869$ | $n_{12} = 1.58313$ | $\nu_{12} = 59.36$ |
| $r_{24} = -25.9767$ | | |
| $d_{24} = 1.2500$ | | |
| $r_{25} = -19.9068$ | | |
| $d_{25} = 1.4830$ | $n_{13} = 1.74100$ | $\nu_{13} = 52.68$ |
| $r_{26} = -20.9013$ | | |
| $d_{26} = D3$ | | |
| $r_{27} = -38.0869$ | | |
| $d_{27} = 2.7902$ | $n_{14} = 1.84666$ | $\nu_{14} = 23.78$ |
| $r_{28} = -21.4684$ | | |

-continued $d_{28} = 2.6534$
$r_{29} = -16.2903$ (aspherical surface)
$d_{29} = 0.3593$  $n_{15} = 1.52492$  $\nu_{15} = 51.77$
$r_{30} = -17.4211$
$d_{30} = 1.3500$  $n_{16} = 1.77250$  $\nu_{16} = 49.66$
$r_{31} = 82.1742$ aspherical surface coefficient
$P = 1.0000, E = 0.20587 \times 10^{-4}, F = 0.86201 \times 10^{-7}$
$G = -0.48242 \times 10^{-9}, H = 0.27293 \times 10^{-11}$

| f | 29.01 | 54.44 | 105.43 |
|---|---|---|---|
| D1 | 1.750 | 1.750 | 1.750 |
| D2 | 1.500 | 15.621 | 21.576 |
| D3 | 17.439 | 8.661 | 2.636 |

$|\phi_f/\phi_1| = 0.18545, \phi_1/\phi_W = 0.322, \phi_{12W}/\phi_W = 1.349$
$h_B/h_F = 1.134, AB/AF = 0.8547, \beta_{3T}/\beta_{3W} = 2.973$ Embodiment 5
$f = 29.51 \sim 131.00$ mm, F/4.5~F/8.25,
$2\omega = 72.48° \sim 18.76°$ $r_1 = 147.7015$
$d_1 = 0.8500$  $n_1 = 1.74100$  $\nu_1 = 52.68$
$r_2 = 39.8775$
$d_2 = 6.9732$
$r_3 = 34.9579$
$d_3 = 4.4400$  $n_2 = 1.53172$  $\nu_2 = 48.90$
$r_4 = -509.1641$
$d_4 = D1$
$r_5 = -55.5614$
$d_5 = 0.8600$  $n_3 = 1.83400$  $\nu_3 = 37.16$
$r_6 = 38.7196$
$d_6 = 0.3489$
$r_7 = 45.0582$
$d_7 = 3.6100$  $n_4 = 1.65844$  $\nu_4 = 50.86$
$r_8 = -134.9701$
$d_8 = 0.1200$
$r_9 = 36.3870$
$d_9 = 4.4600$  $n_5 = 1.50137$  $\nu_5 = 56.40$
$r_{10} = -55.5290$
$d_{10} = D2$
$r_{11} = -74.3691$
$d_{11} = 0.5500$  $n_6 = 1.78590$  $\nu_6 = 44.18$
$r_{12} = 15.5103$
$d_{12} = 0.7341$
$r_{13} = 24.6834$
$d_{13} = 2.6600$  $n_7 = 1.78470$  $\nu_7 = 26.22$
$r_{14} = -63.3984$
$d_{14} = D3$
$r_{15} = -13.9591$
$d_{15} = 0.9163$  $n_8 = 1.65830$  $\nu_8 = 53.44$
$r_{16} = -16.2221$
$d_{16} = 4.3715$
$r_{17} = \infty$ (stop)
$d_{17} = 3.3080$
$r_{18} = -77.7267$
$d_{18} = 1.7100$  $n_9 = 1.66680$  $\nu_9 = 33.04$
$r_{19} = -56.3440$
$d_{19} = 0.1400$
$r_{20} = -322.6649$
$d_{20} = 2.3300$  $n_{10} = 1.50137$  $\nu_{10} = 56.40$
$r_{21} = -24.8971$
$d_{21} = 0.1200$
$r_{22} = 74.2271$
$d_{22} = 0.5300$  $n_{11} = 1.80518$  $\nu_{11} = 25.43$
$r_{23} = 17.1956$
$d_{23} = 5.1000$  $n_{12} = 1.60311$  $\nu_{12} = 60.70$
$r_{24} = -24.4180$
$d_{24} = 1.0490$
$r_{25} = -20.8299$
$d_{25} = 0.8800$  $n_{13} = 1.77250$  $\nu_{13} = 49.66$
$r_{26} = -22.2142$
$d_{26} = D4$
$r_{27} = -50.1298$
$d_{27} = 3.2000$  $n_{14} = 1.78472$  $\nu_{14} = 25.71$
$r_{28} = -21.5995$
$d_{28} = 2.3876$
$r_{29} = -14.9318$ (aspherical surface)
$d_{29} = 0.4500$  $n_{15} = 1.52492$  $\nu_{15} = 51.77$
$r_{30} = -15.1591$
$d_{30} = 1.1900$  $n_{16} = 1.77250$  $\nu_{16} = 49.66$
$r_{31} = 52.7870$ aspherical surface coefficient
$P = 1.0000, E = 0.45142 \times 10^{-4}, F = 0.15406 \times 10^{-6}$
$G = -0.58035 \times 10^{-9}, H = 0.42319 \times 10^{-11}$

| f | 29.51 | 62.50 | 131.00 |
|---|---|---|---|
| D1 | 1.460 | 1.460 | 1.460 |
| D2 | 0.766 | 17.061 | 22.292 |
| D3 | 4.073 | 3.798 | 3.630 |
| D4 | 15.086 | 6.568 | 15.369 |

$|\phi_f/\phi_1| = 0.34602, \phi_1/\phi_W = 0.360, \phi_{12W}/\phi_W = 1.385$
$h_B/h_F = 1.0767, AB/AF = 0.9845, \beta_{3T}/\beta_{3W} = 3.442$ Embodiment 6
$f = 29.30 \sim 102.00$ mm, F/4.6~F/7.65,
$2\omega = 72.88° \sim 23.94°$ $r_1 = -60.5111$
$d_1 = 1.2500$  $n_1 = 1.74100$  $\nu_1 = 52.68$
$r_2 = -103.1603$
$d_2 = 0.2000$
$r_3 = 51.3114$
$d_3 = 2.6500$  $n_2 = 1.53172$  $\nu_2 = 48.90$
$r_4 = 254.0371$
$d_4 = 1.0500$
$r_5 = -148.9276$
$d_5 = 0.8500$  $n_3 = 1.83400$  $\nu_3 = 37.16$
$r_6 = 27.9011$
$d_6 = 0.3000$
$r_7 = 28.5843$
$d_7 = 4.0000$  $n_4 = 1.65844$  $\nu_4 = 50.86$
$r_8 = 451.3443$
$d_8 = 0.1200$
$r_9 = 47.3480$
$d_9 = 4.0500$  $n_5 = 1.65830$  $\nu_5 = 53.44$
$r_{10} = -73.2687$
$d_{10} = D1$
$r_{11} = -192.7657$
$d_{11} = 0.5000$  $n_6 = 1.78590$  $\nu_6 = 44.18$
$r_{12} = 11.3110$
$d_{12} = 0.6696$
$r_{13} = 21.2161$
$d_{13} = 1.9980$  $n_7 = 1.78470$  $\nu_7 = 26.22$
$r_{14} = -75.8136$
$d_{14} = 5.3056$
$r_{15} = \infty$ (stop)
$d_{15} = 3.6513$
$r_{16} = -18.5732$
$d_{16} = 2.1356$  $n_8 = 1.59551$  $\nu_8 = 39.21$
$r_{17} = -19.9100$
$d_{17} = 0.5046$
$r_{18} = -31.4506$
$d_{18} = 1.5121$  $n_9 = 1.50137$  $\nu_9 = 56.40$
$r_{19} = -18.2746$
$d_{19} = 0.1200$
$r_{20} = 75.5019$
$d_{20} = 0.8500$  $n_{10} = 1.84666$  $\nu_{10} = 23.78$
$r_{21} = 19.0505$
$d_{21} = 3.9996$  $n_{11} = 1.60881$  $\nu_{11} = 58.94$
$r_{22} = -17.4005$
$d_{22} = D2$
$r_{23} = -45.2876$
$d_{23} = 3.0000$  $n_{12} = 1.78472$  $\nu_{12} = 25.71$
$r_{24} = -18.7253$
$d_{24} = 2.6527$
$r_{25} = -12.9546$ (aspherical surface)
$d_{25} = 0.1000$  $n_{13} = 1.52492$  $\nu_{13} = 51.77$
$r_{26} = -14.0500$
$d_{26} = 1.0000$  $n_{14} = 1.79952$  $\nu_{14} = 42.24$
$r_{27} = 119.6924$ aspherical surface coefficient
$P = 1.0000, E = 0.37563 \times 10^{-4}, F = 0.36933 \times 10^{-6}$
$G = -0.27582 \times 10^{-8}, H = 0.24748 \times 10^{-10}$

| f | 29.30 | 54.52 | 102.00 |
|---|---|---|---|
| D1 | 1.136 | 13.805 | 20.500 |
| D2 | 15.118 | 6.870 | 0.998 |

$|\phi_f/\phi_1| = 0.25624, \phi_1/\phi_W = 0.385, \phi_{12W}/\phi_W = 1.346$
$h_B/h_F = 0.9986, AB/AF = 1.0469, \beta_{3T}/\beta_{3W} = 2.651$ wherein the reference symbols $r_1, r_2, \ldots$ represent radii of curvature on respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

Figure 8:
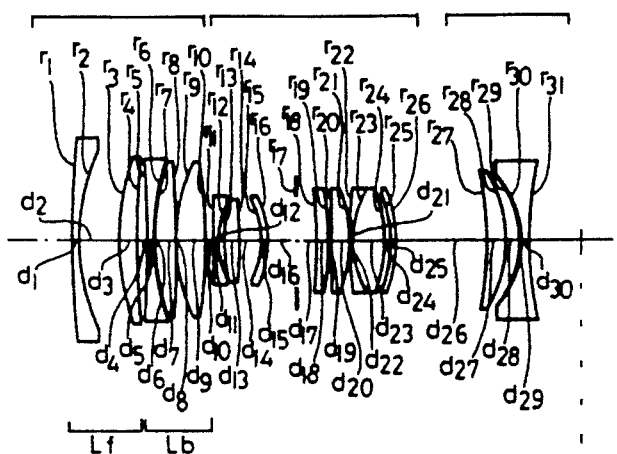
FIG. 8 through FIG. 13 show sectional views illustrating compositions of a first embodiment through a sixth embodiment of the zoom lens system according to the present invention.
Figure 8:
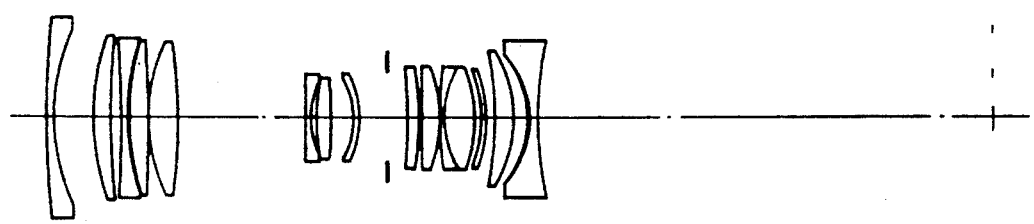

The first embodiment is a wide angle zoom lens system which has focal length f from 29.0 to 105 mm and has a composition illustrated in FIG. 8.

The zoom lens system preferred as the first embodiment has a total length which is not shortened so remarkably, or a little shorter than 90 mm at the wide position thereof, and features favorable optical performance which is stable over the entire vari-focal range. Aberration characteristics of the first embodiment are visualized in FIG. 14 through FIG. 19.

Figure 9:
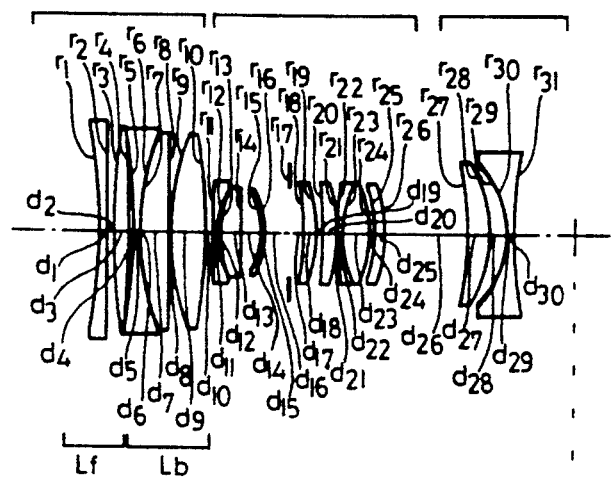
Figure 9:
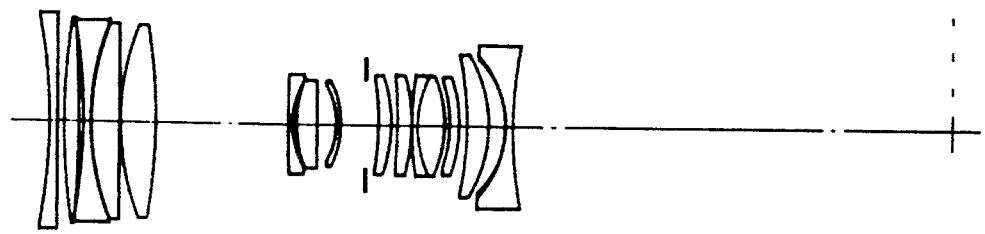

The second embodiment is a wide angle zoom lens system which has focal length f from 28.9 to 102 mm and a composition shown in FIG. 9. Unlike the first embodiment, the second embodiment comprises a lens element which is arranged in the second lens unit for correcting an image surface. As a result, the second embodiment has a total length which is prolonged a little.

Aberration characteristics of the second embodiment are illustrated in FIG. 20 through FIG. 25.

Figure 10:
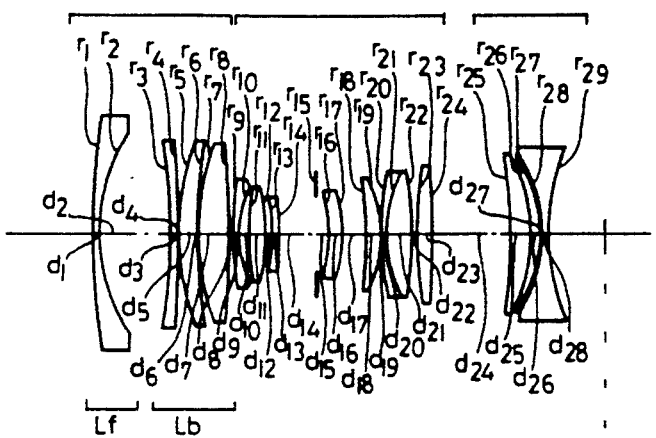
Figure 10:
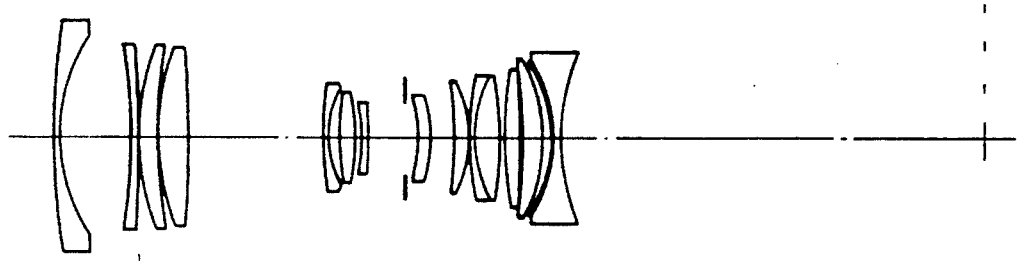

The third embodiment is a wide angle zoom lens system which has focal length f from 24.5 to 76.5 mm covering a range of super wide field angles. As shown in FIG. 10, the front subunit of the first lens unit consists of a single negative lens component and the second lens unit has a characteristic composition. Further, not only the third lens unit but also the second lens unit comprises an aspherical surface for correcting aberrations favorably.

Aberration characteristics of the third embodiment are shown in FIG. 26 through FIG. 31.

Figure 11:
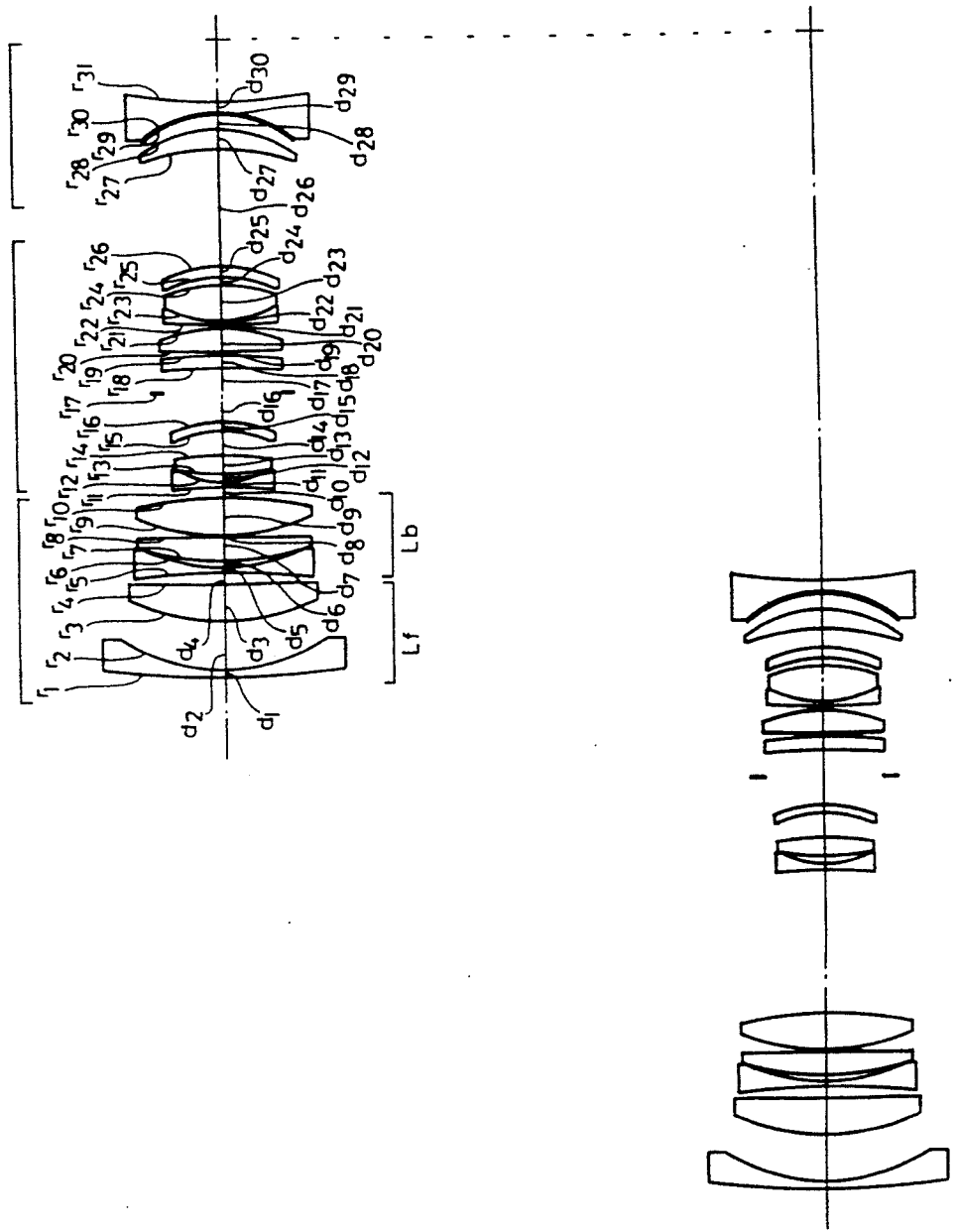

Thr fourth embodiment is a wide angle zoom lens system which has focal length f from 29.0 to 105 mm. The fourth embodiment has a composition illustrated in FIG. 11 and features improved optical performance though it is relatively long in the total length thereof.

Aberration characteristics of the fourth embodiment are illustrated in FIG. 32 through FIG. 37.

Figure 12:
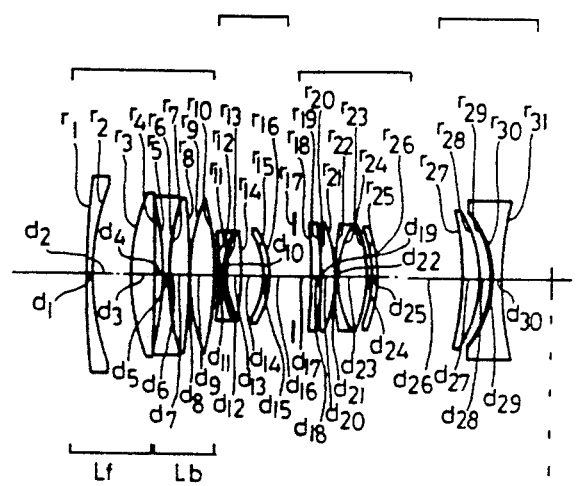
Figure 12:
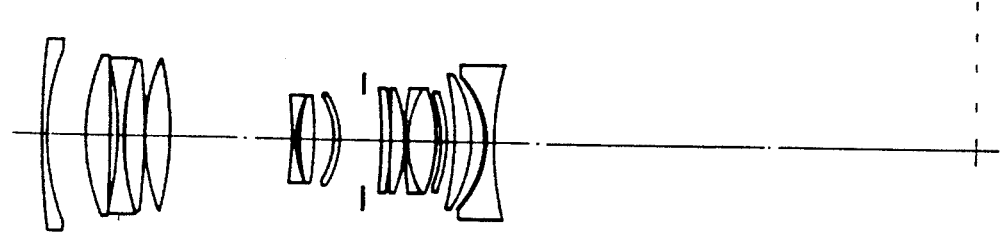

The fifth embodiment is a wide angle zoom lens system which has focal length f from 29.5 to 131 mm and a high vari-focal ratio. The fifth embodiment has a composition shown in FIG. 12 and consists of four lens units. This embodiment has a shortened total length of 83.6 mm at the wide position thereof and a back focal length of 8.92 nun.

Aberration characteristics of the fifth embodiment are visualized in FIG. 38 through FIG. 43.

Figure 13:
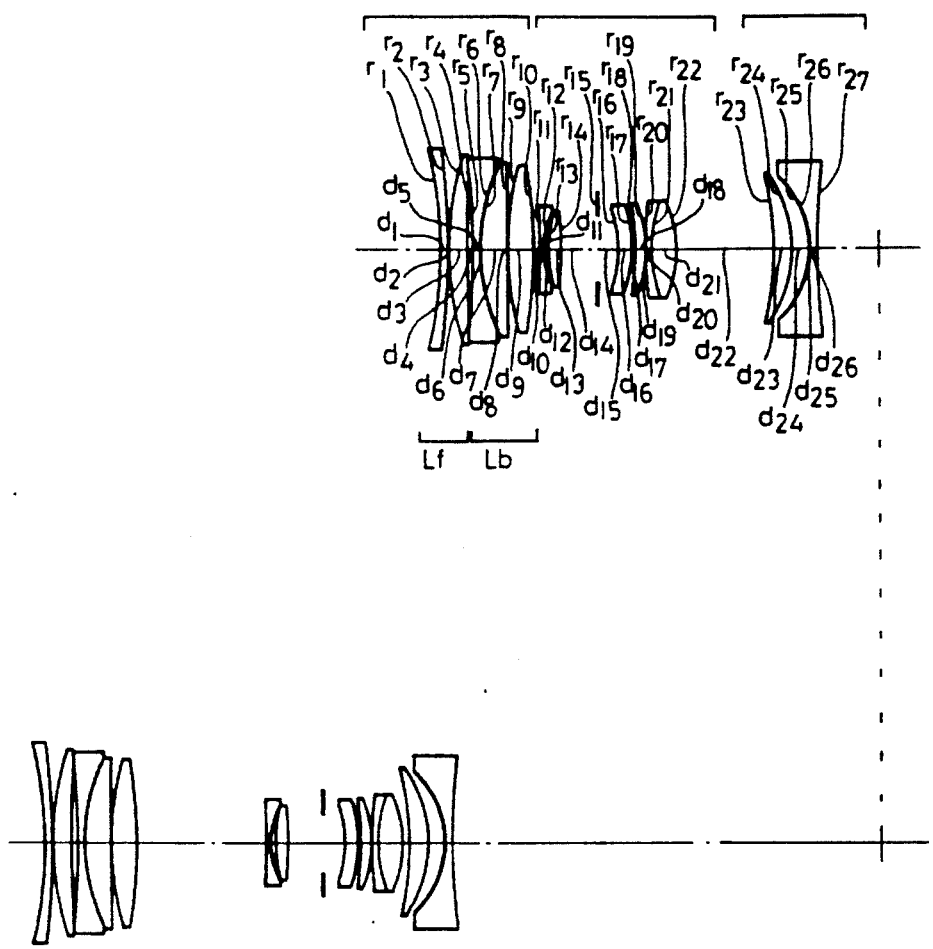
Figure 14:
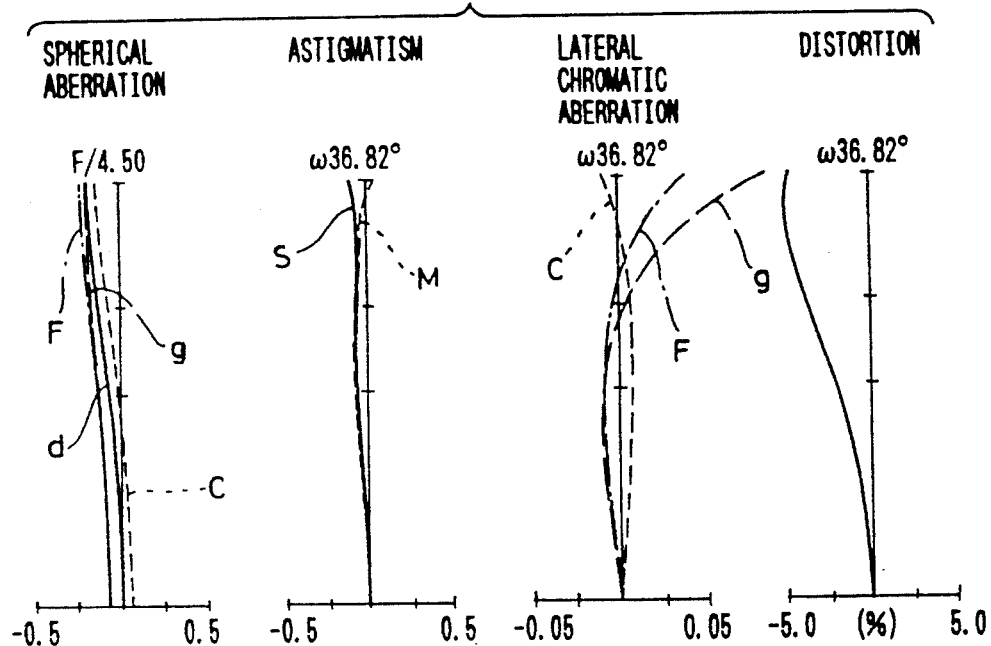
FIG. 14 shows graphs illustrating aberration characteristics of the first embodiment for an object located at infinite distance at the wide position thereof.
Figure 15:
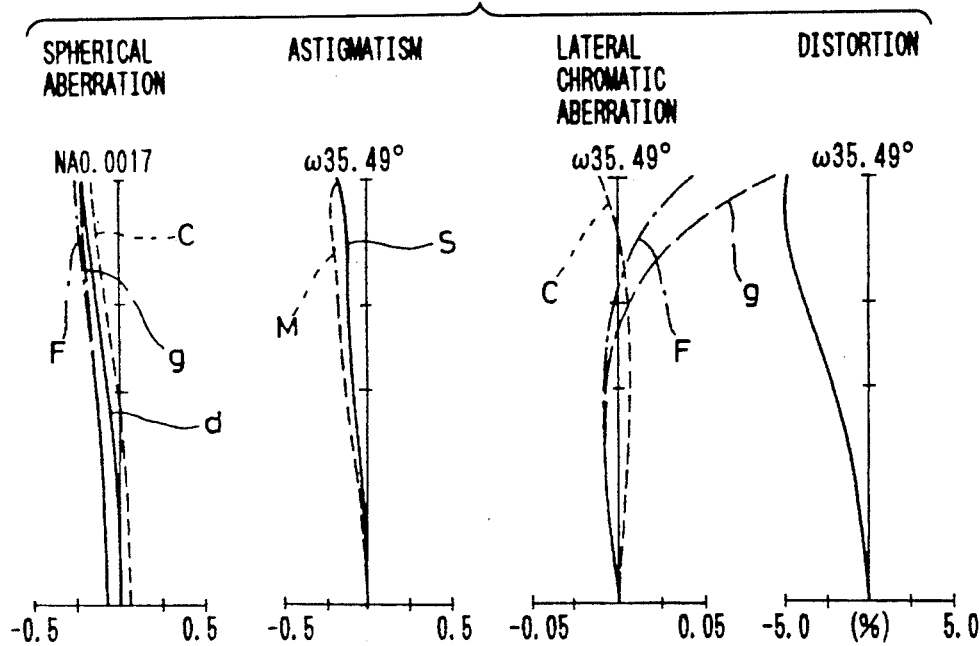
FIG. 15 shows graphs illustrating aberration characteristics of the first embodiment for an object located at a distance of 2.0 m at the wide position thereof.
Figure 16:
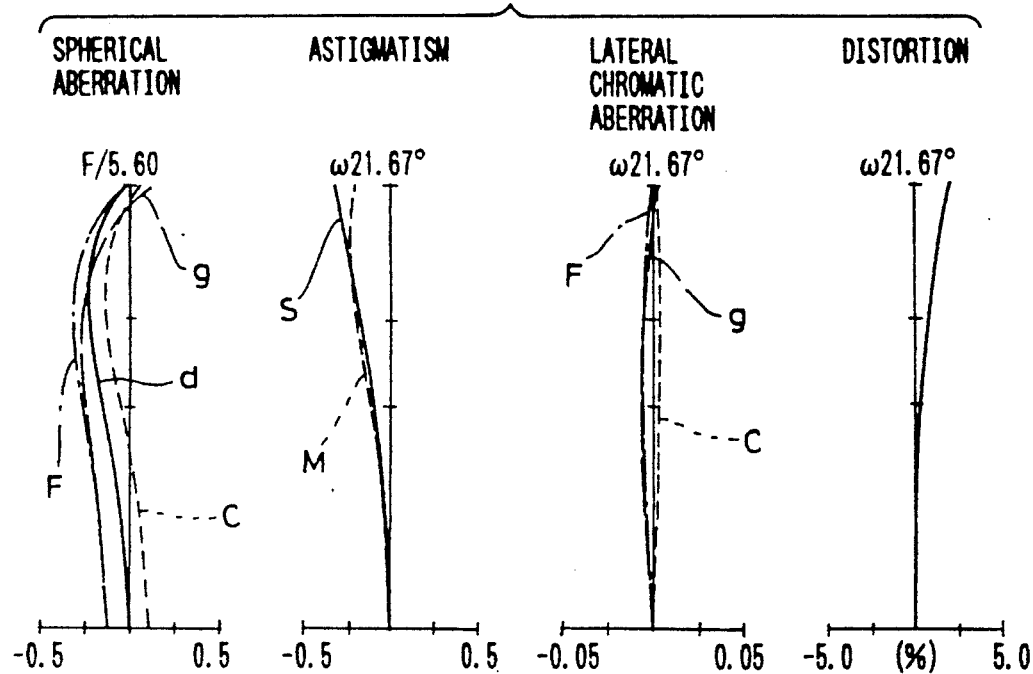
FIG. 16 shows graphs illustrating aberration characteristics of the first embodiment for the objected located at infinite distance at an intermediate focal length thereof.
Figure 17:
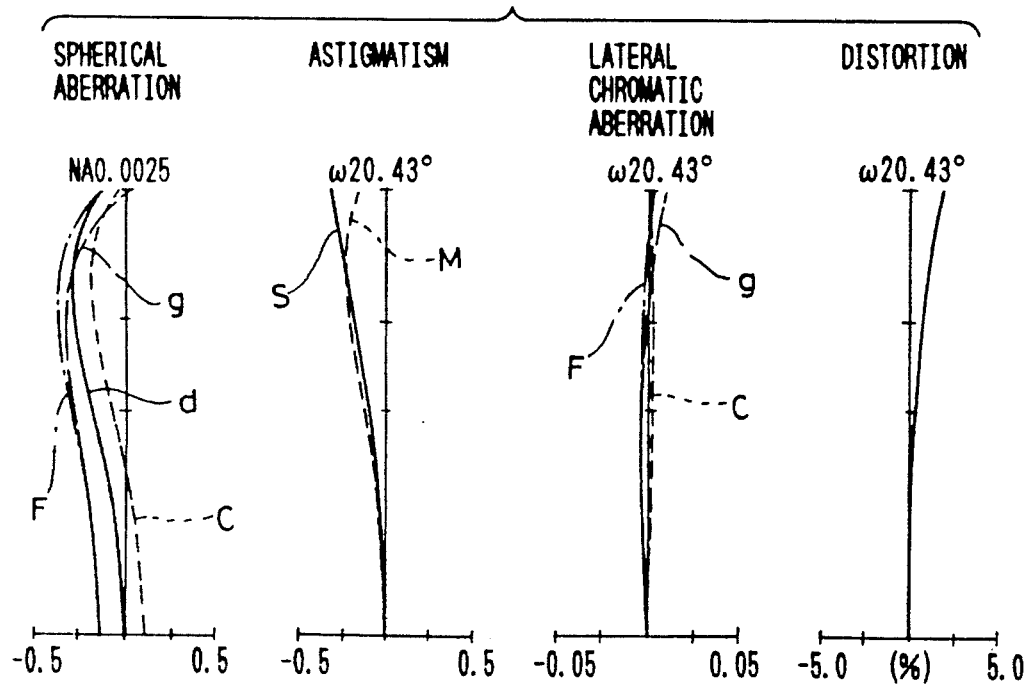
FIG. 17 shows graphs illustrating aberration characteristics of the first embodiment for the object located at the distance of 2.0 m at the intermediate focal length thereof.
Figure 18:
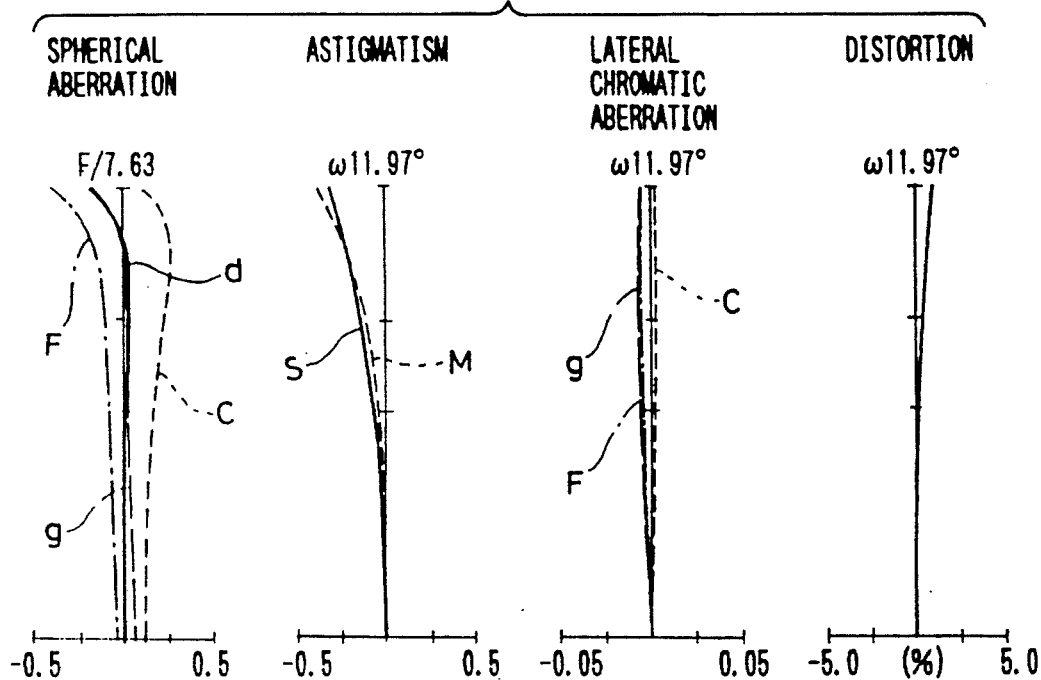
FIG. 18 shows graphs illustrating aberration characteristics of the first embodiment for the object located at the infinite distance at the tele position thereof.
Figure 19:
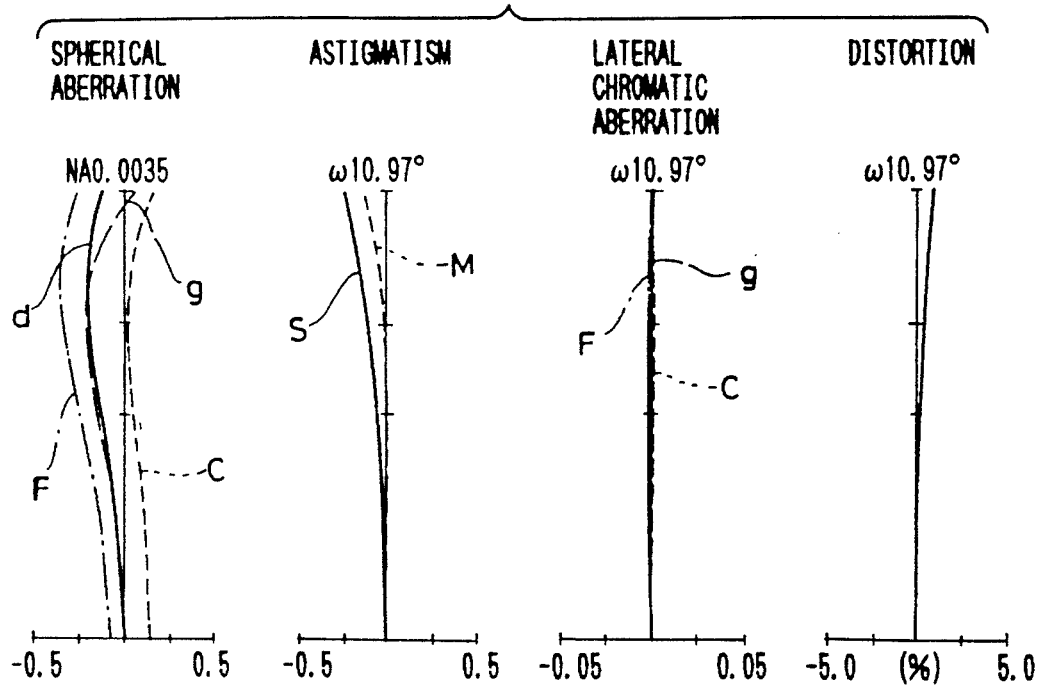
FIG. 19 shows graphs illustrating aberration characteristics of the first embodiment for the object located at the distance of 2.0 m at the tele position thereof.
Figure 20:
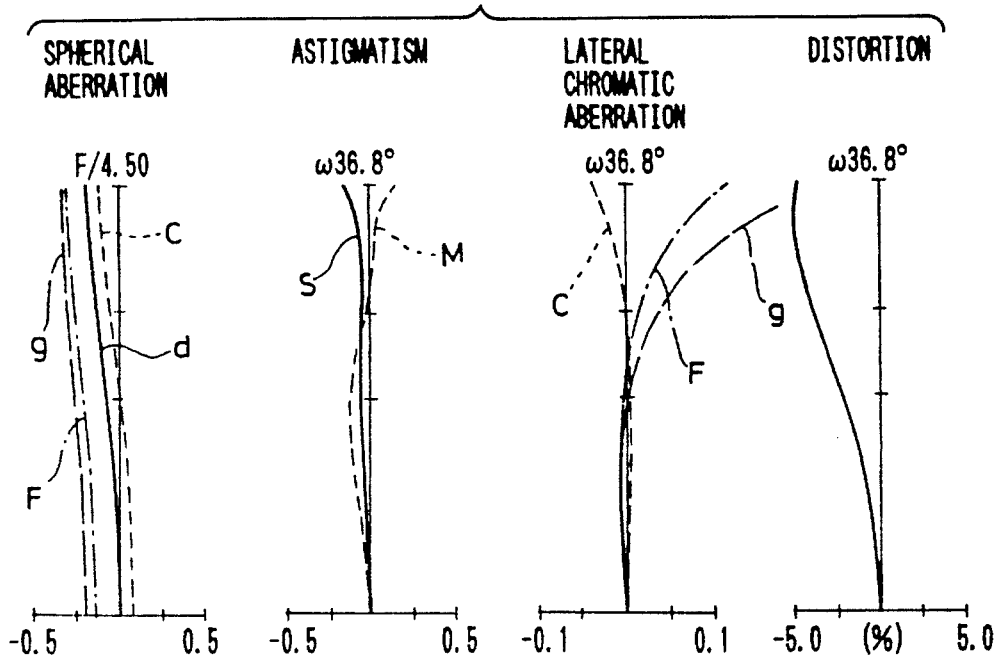
FIG. 20 shows curves illustrating aberration characteristics of the second embodiment for the object located at the infinite distance at the wide position thereof.
Figure 21:
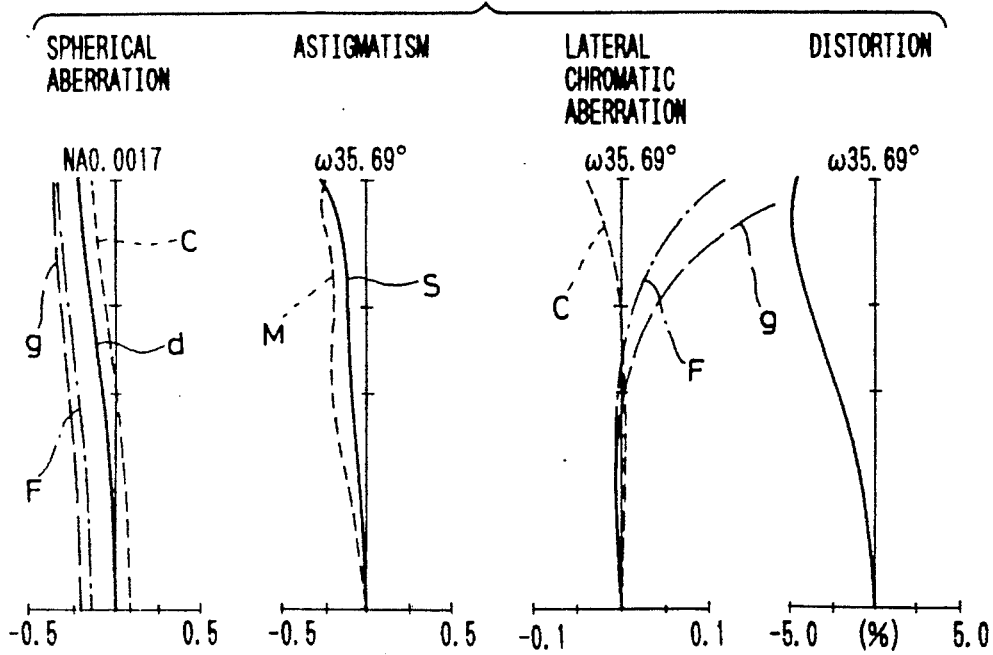
FIG. 21 shows curves illustrating aberration characteristics of the second embodiment for the object located at the distance of 2.0 m at the wide position thereof.
Figure 22:
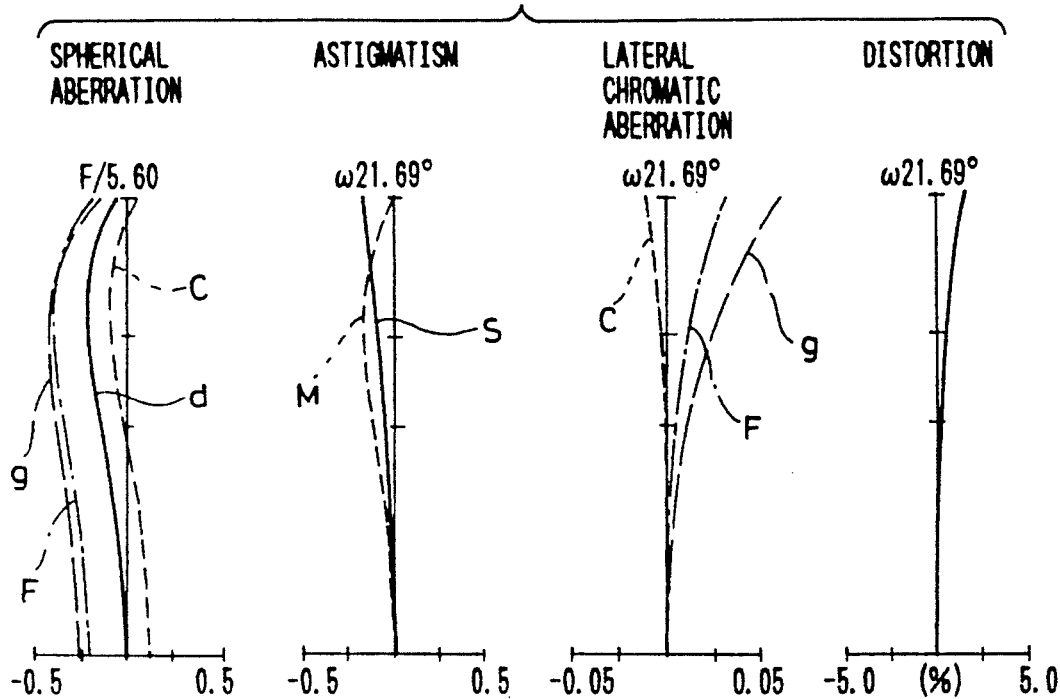
FIG. 22 shows curves illustrating aberration characteristics of the second embodiment for the object located at the infinite distance at the intermediate focal length thereof.
Figure 23:
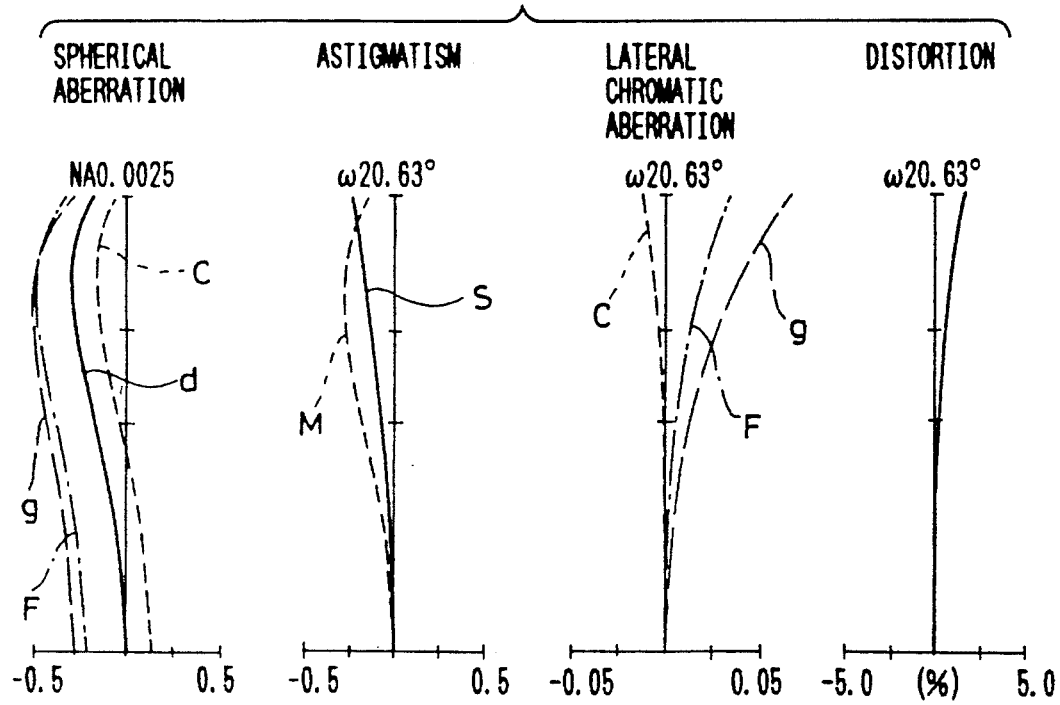
FIG. 23 shows curves illustrating aberration characteristics of the second embodiment for the object located at the distance of 2.0 m at the intermediate focal length thereof.
Figure 24:
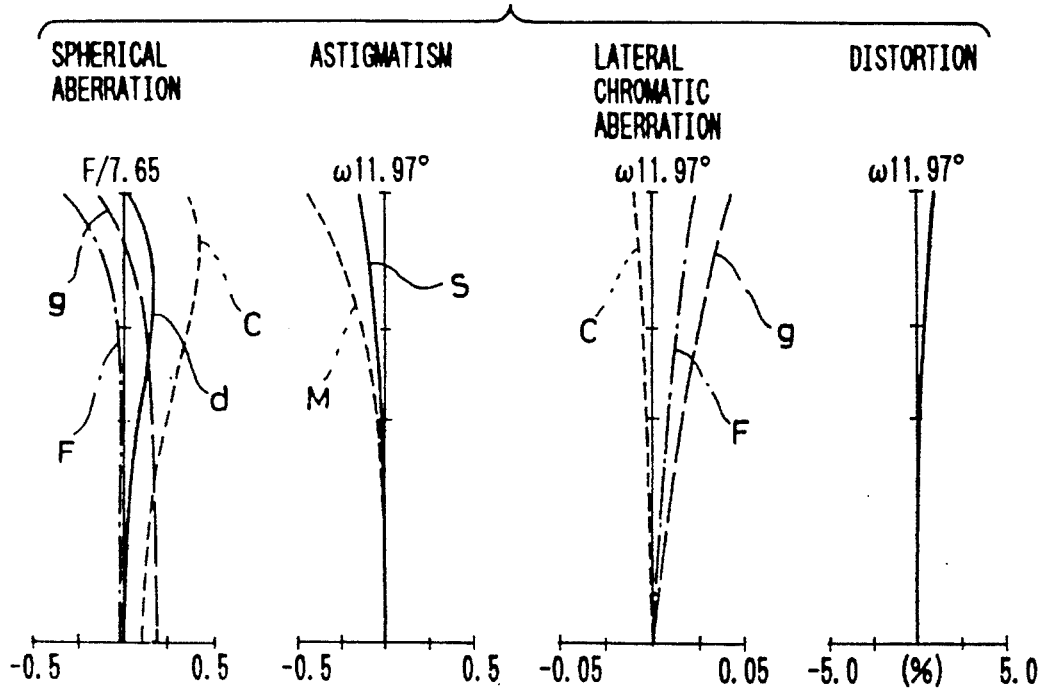
FIG. 24 shows curves illustrating aberration characteristics of the second embodiment for the object located at the infinite distance at the tele position thereof.
Figure 25:
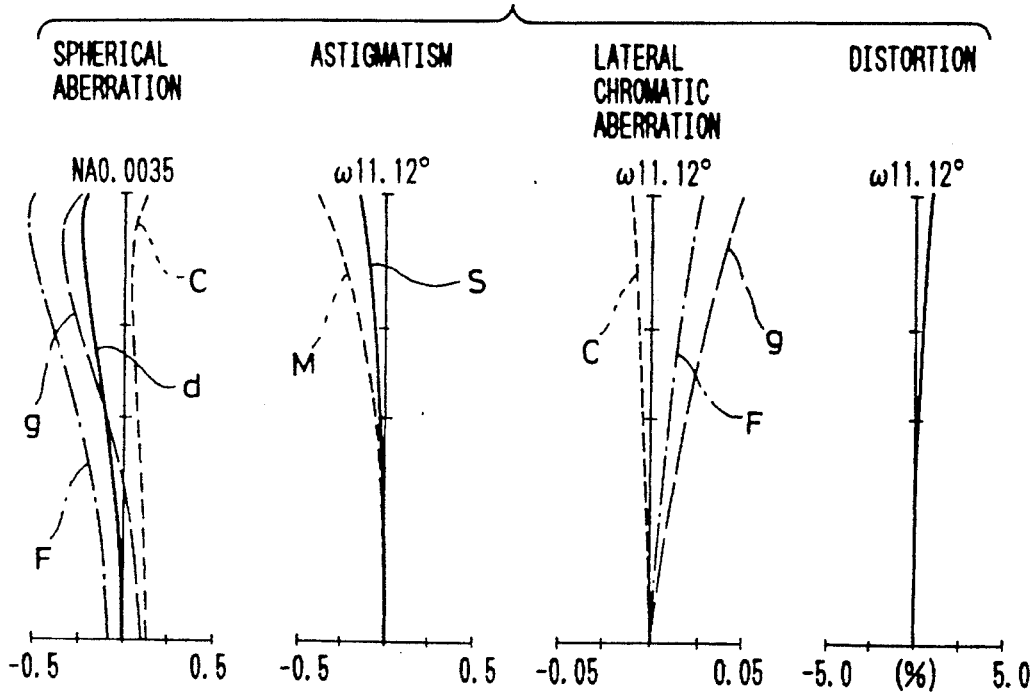
FIG. 25 shows curves illustrating aberration characteristics of the second embodiment for the object located at the distance of 2.0 m at the tele position thereof.
Figure 26:
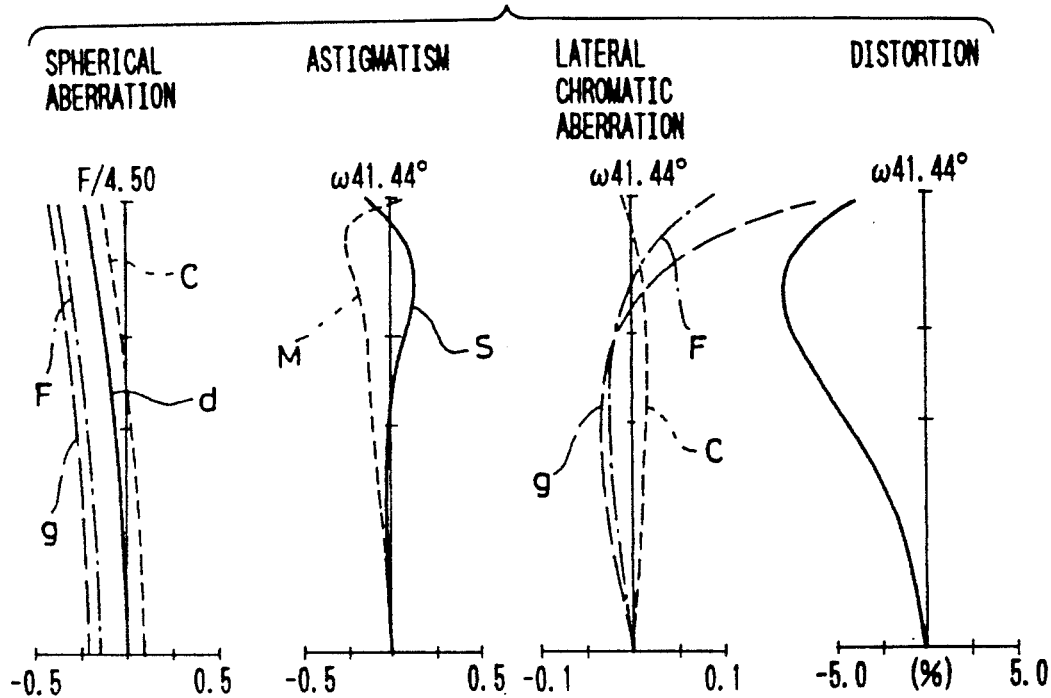
FIG. 26 shows graphs illustrating aberration characteristics of the third embodiment for the object located at the infinite distance at the wide position thereof.
Figure 27:
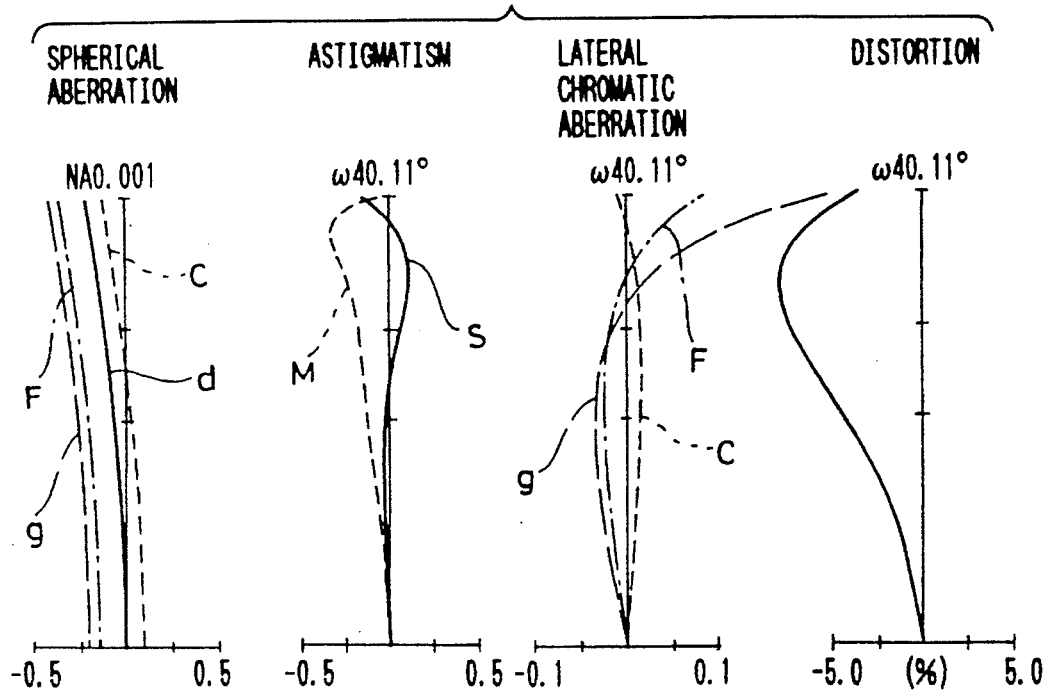
FIG. 27 shows graphs illustrating aberration characteristics of the third embodiment for the object located at the distance of 2.0 m at the wide position thereof.
Figure 28:
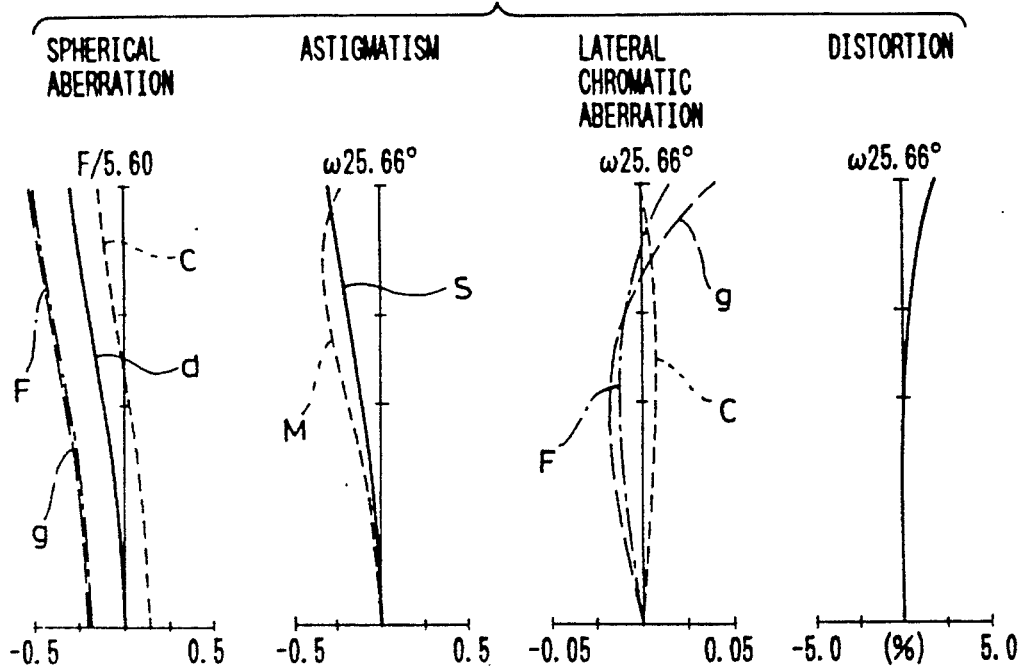
FIG. 28 shows graphs illustrating aberration characteristics of the third embodiment for the object located at the infinite distance at the intermediate focal length thereof.
Figure 29:
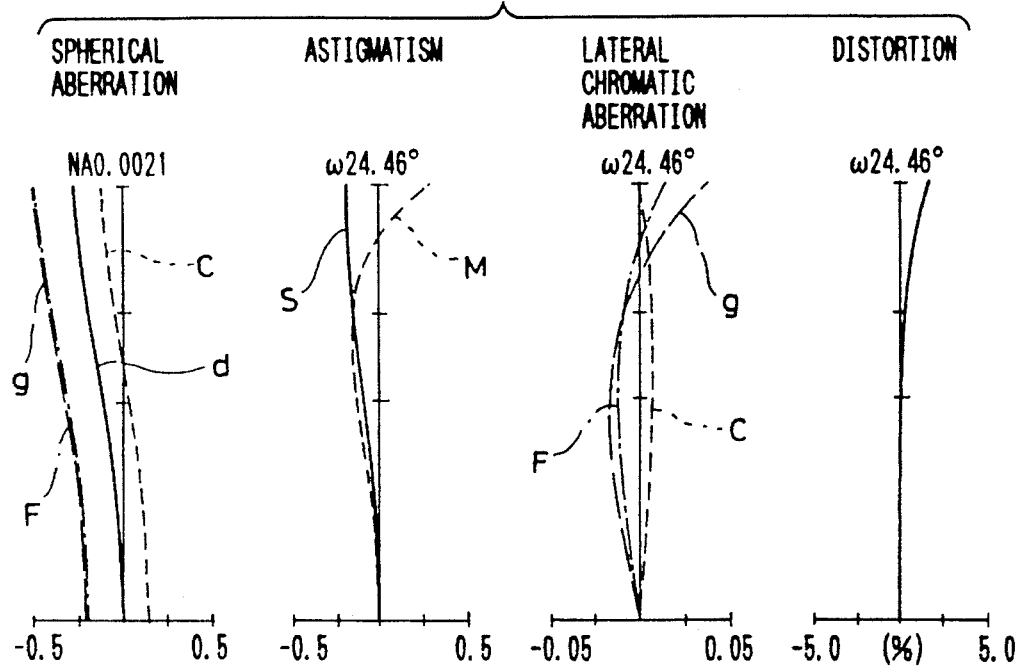
FIG. 29 shows graphs illustrating aberration characteristics of the third embodiment for the object located at the distance of 2.0 m at the intermediate focal length thereof.
Figure 30:
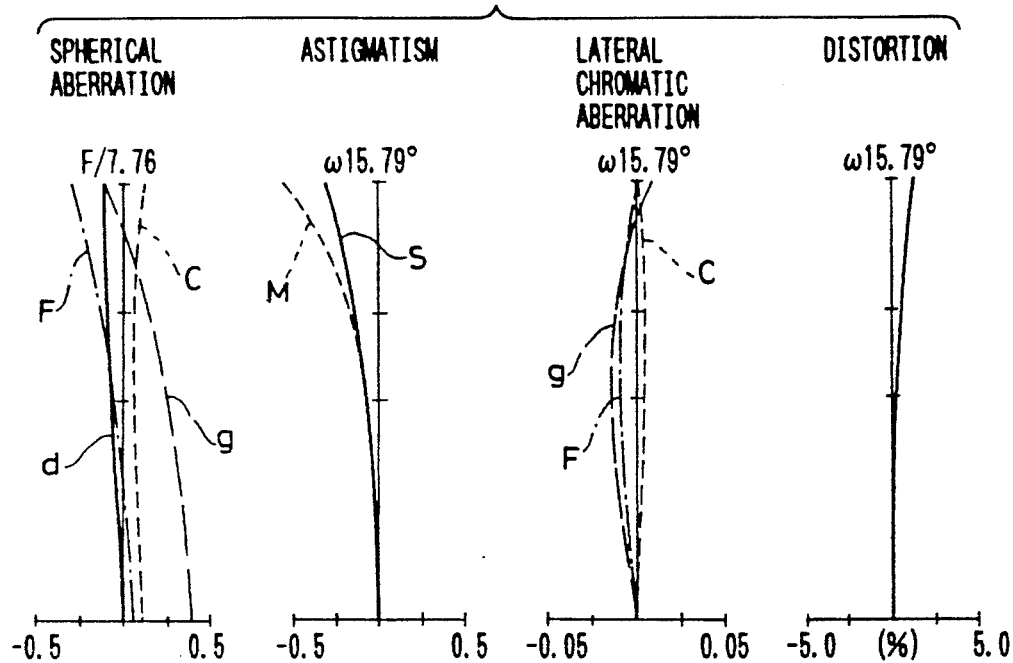
FIG. 30 shows graphs illustrating aberration characteristics of the third embodiment for the object located at the infinite distance at the tele position thereof.
Figure 31:
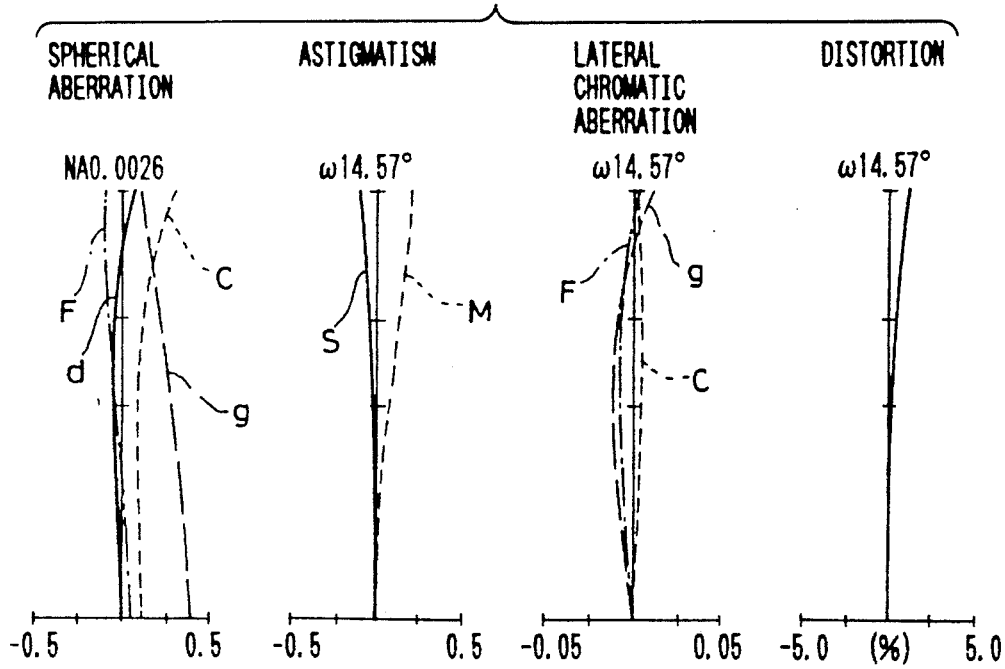
FIG. 31 shows graphs illustrating aberration characteristics of the third embodiment for the object located at the distance of 2.0 m at the tele position thereof.
Figure 32:
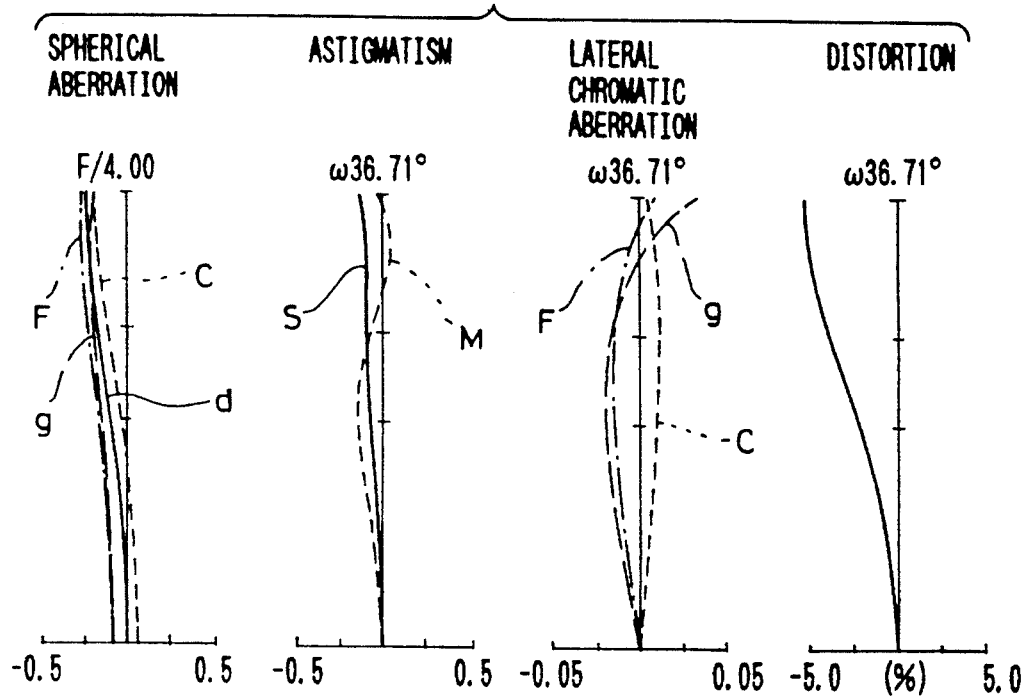
FIG. 32 shows curves illustrating aberration characteristics of the fourth embodiment for the object located at the infinite distance at the wide position thereof.
Figure 33:
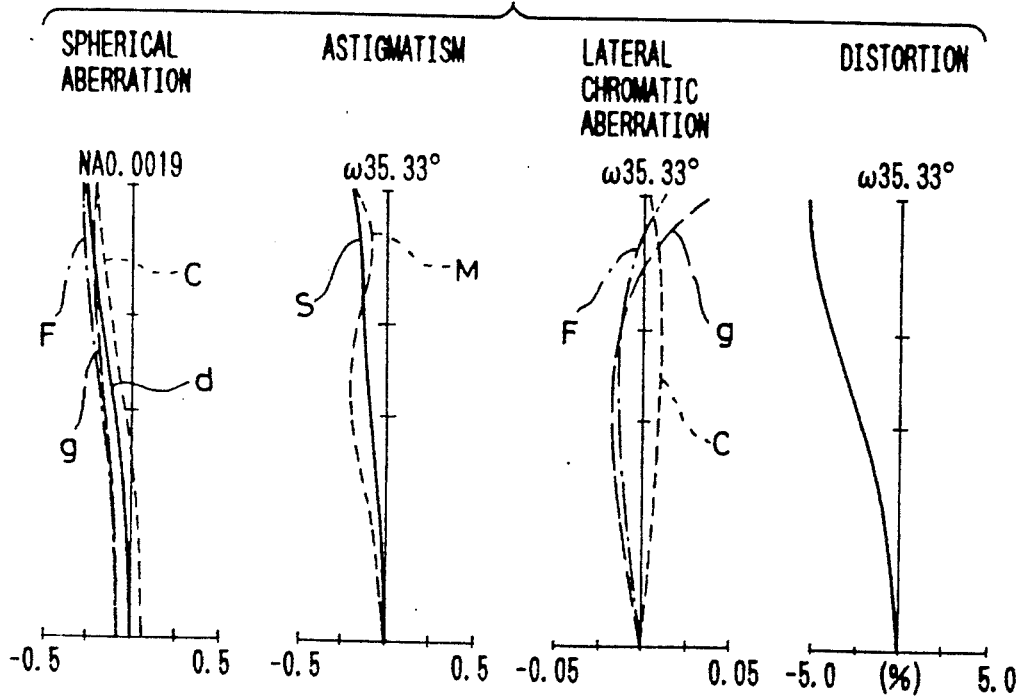
FIG. 33 shows curves illustrating aberration characteristics of the fourth embodiment for the object located at the distance of 2.0 m at the wide position thereof.
Figure 34:
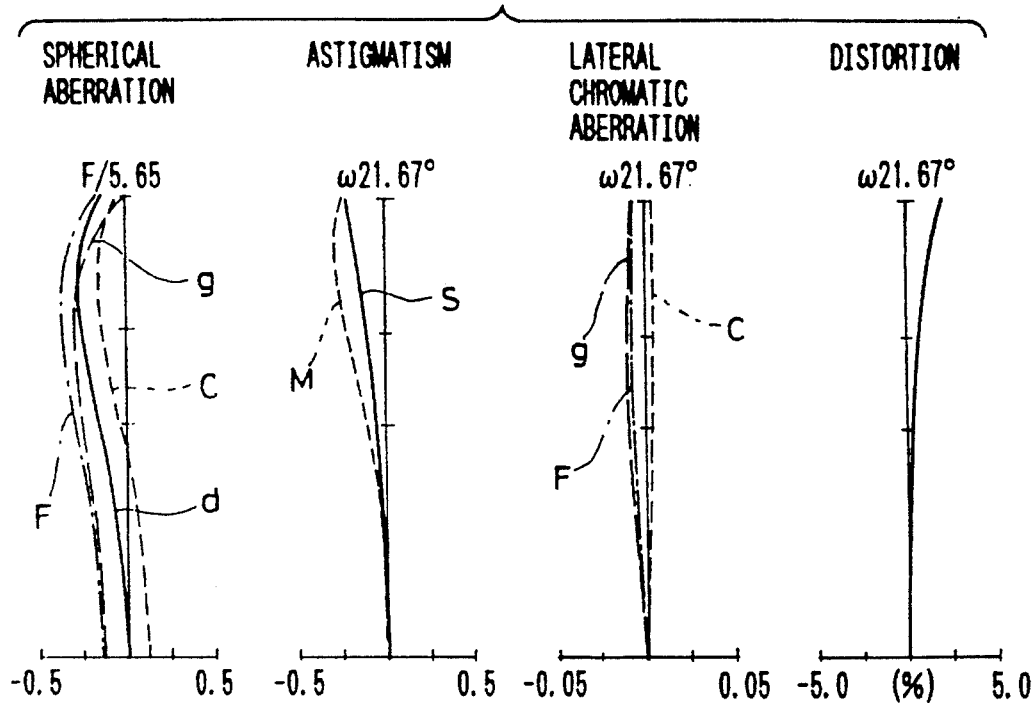
FIG. 34 shows curves illustrating aberration characteristics of the fourth embodiment for the object located at the infinite distance at the intermediate focal length thereof.
Figure 35:
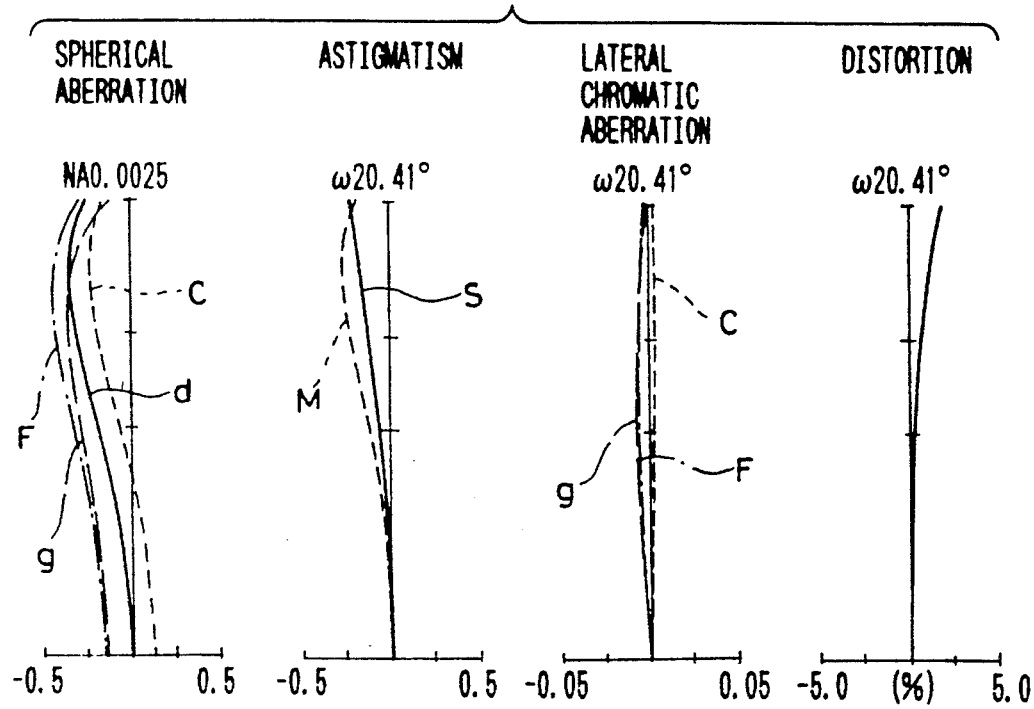
FIG. 35 shows curves illustrating aberration characteristics of the fourth embodiment for the object located at the distance of 2.0 m at the intermediate focal length thereof.
Figure 36:
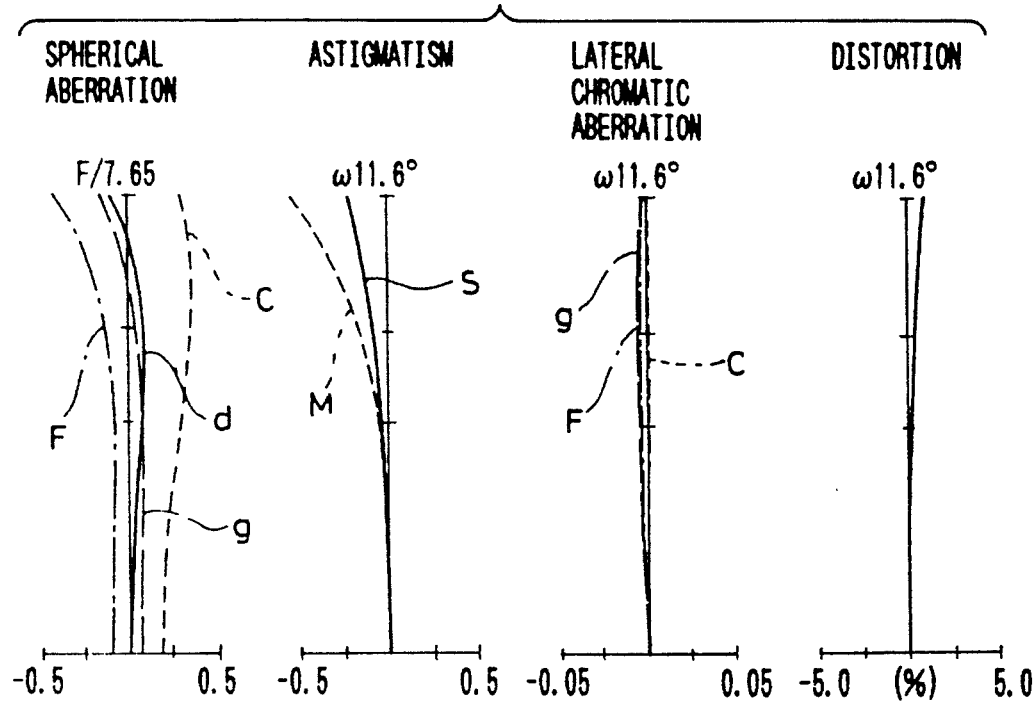
FIG. 36 shows curves illustrating aberration characteristics of the fourth embodiment for the object located at the infinite distance at the tele position thereof.
Figure 37:
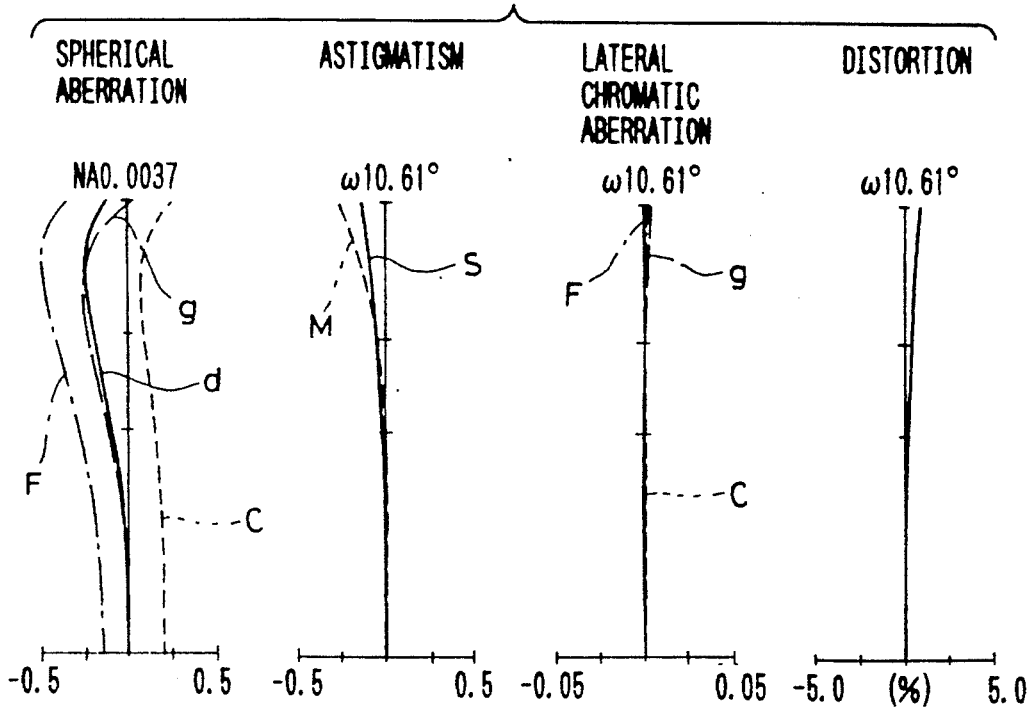
FIG. 37 shows curves illustrating aberration characteristics of the fourth embodiment for the object located at the distance of 2.0 m at the tele position thereof.
Figure 38:
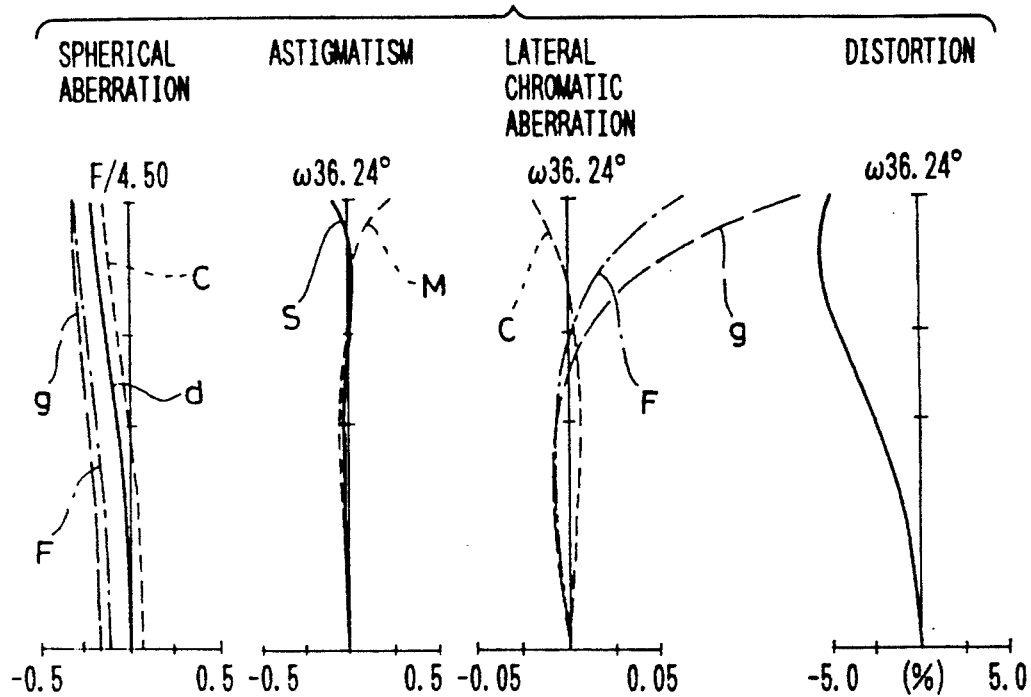
FIG. 38 shows graphs illustrating aberration characteristics of the fifth embodiment for the object located at the infinite distance at the wide position thereof.
Figure 39:
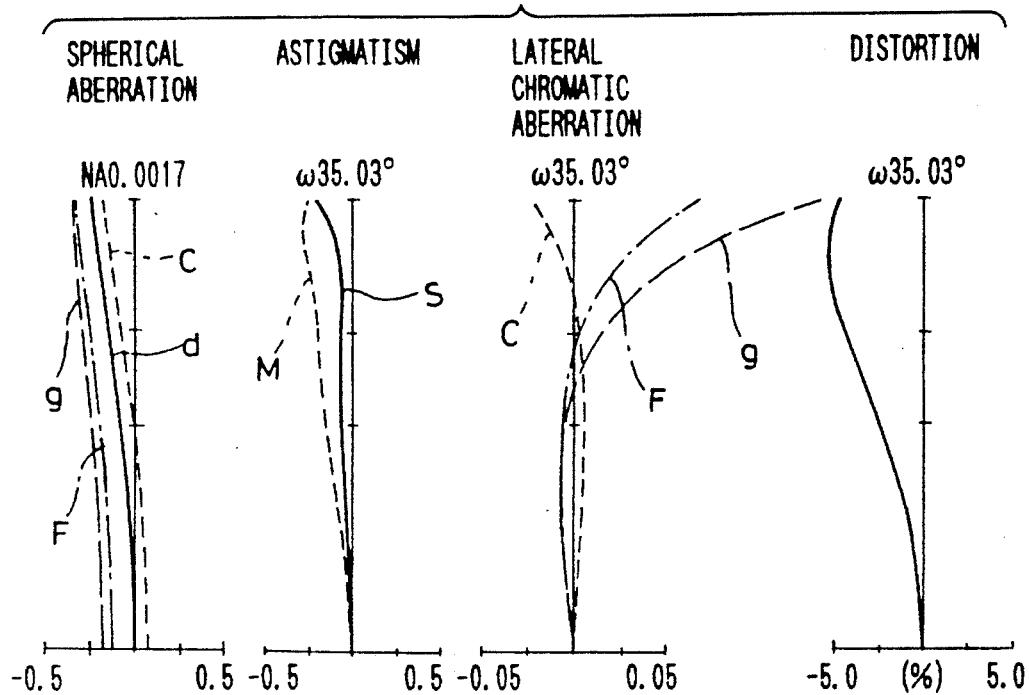
FIG. 39 shows graphs illustrating aberration characteristics of the fifth embodiment for the object located at the distance of 2.0 m at the wide position thereof.
Figure 40:
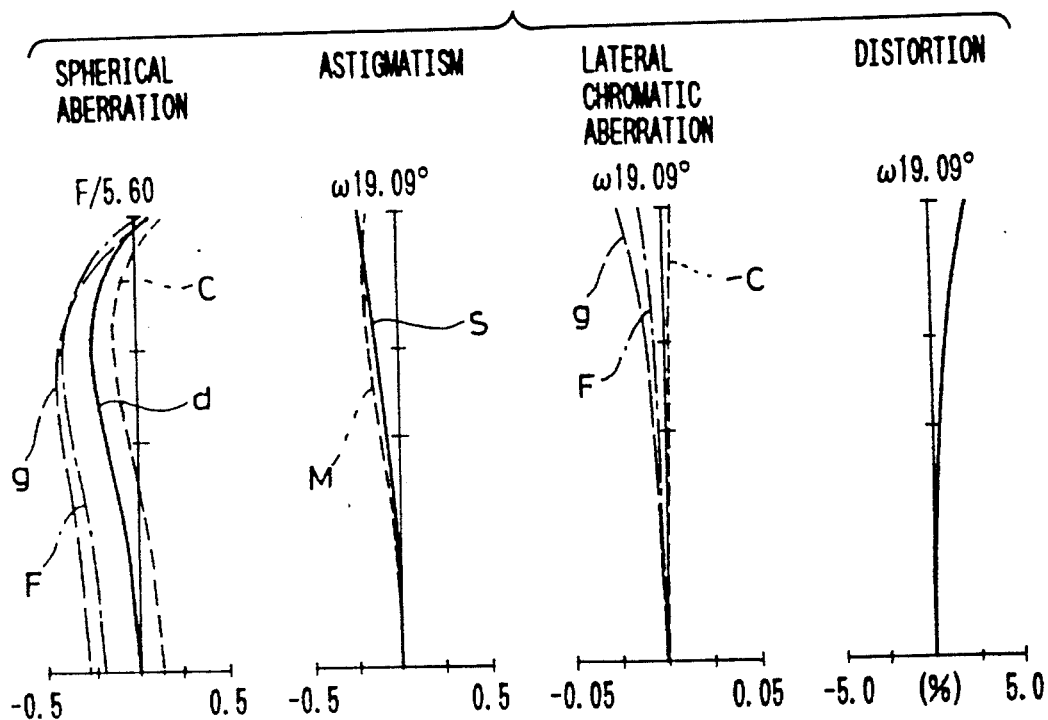
FIG. 40 shows graphs illustrating aberration characteristics of the fifth embodiment for the object located at the infinite distance at the intermediate focal length thereof.
Figure 41:
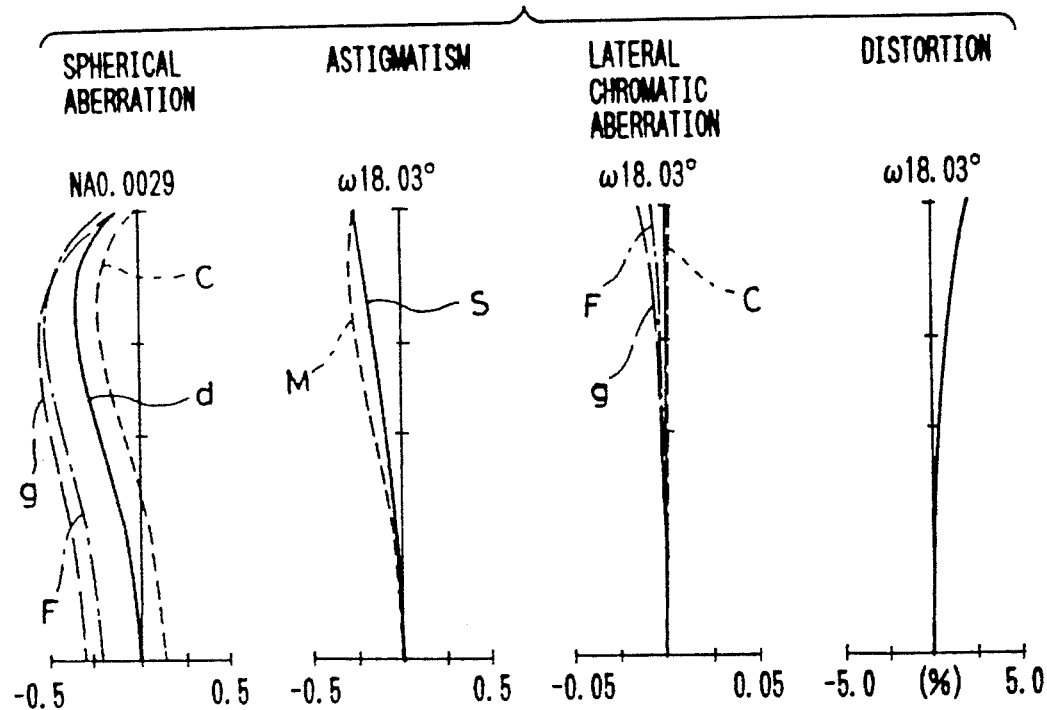
FIG. 41 shows graphs illustrating aberration characteristics of the fifth embodiment for the object located at the distance of 2.0 m at the intermediate focal length thereof.
Figure 42:
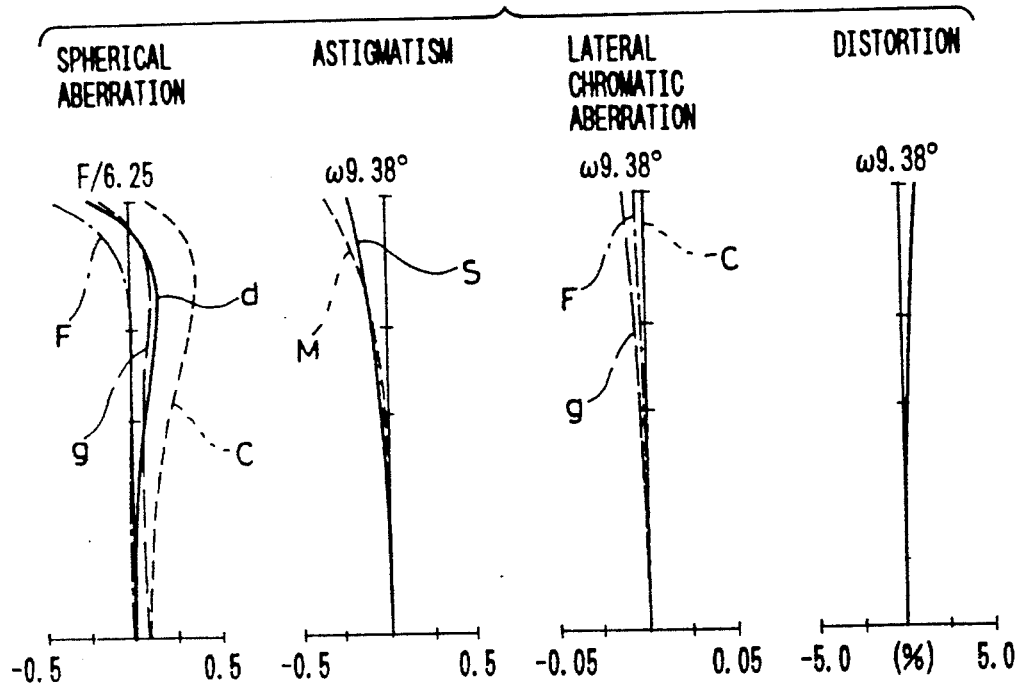
FIG. 42 shows graphs illustrating aberration characteristics of the fifth embodiment for the object located at the infinite distance at the tele position thereof.
Figure 43:
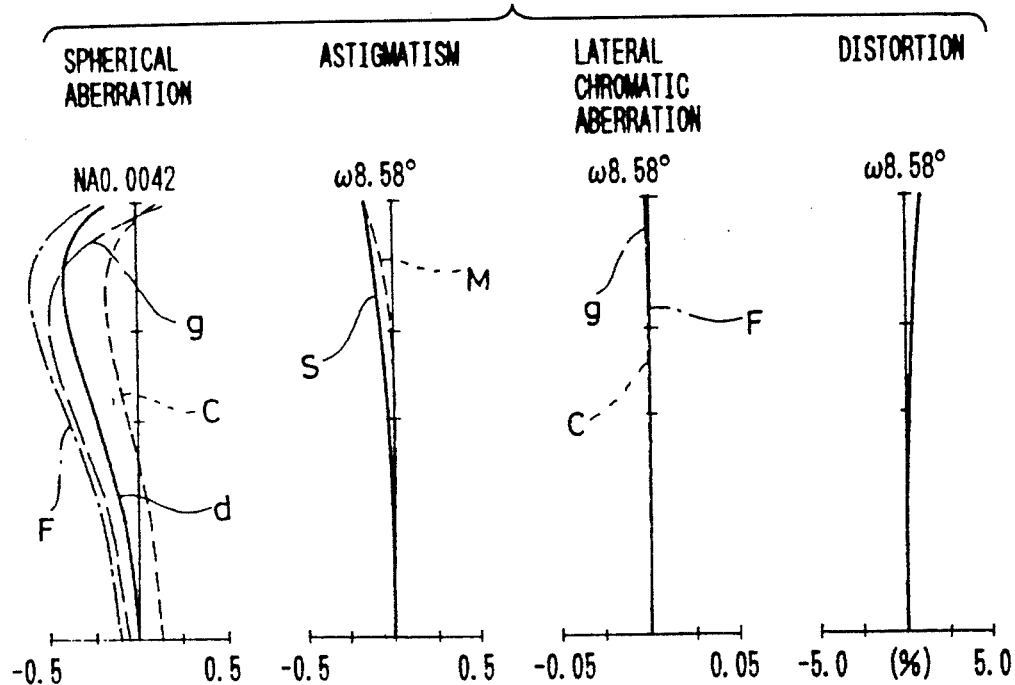
FIG. 43 shows graphs illustrating aberration characteristics of the fifth embodiment for the object located at the distance of 2.0 m at the tele position thereof.
Figure 44:
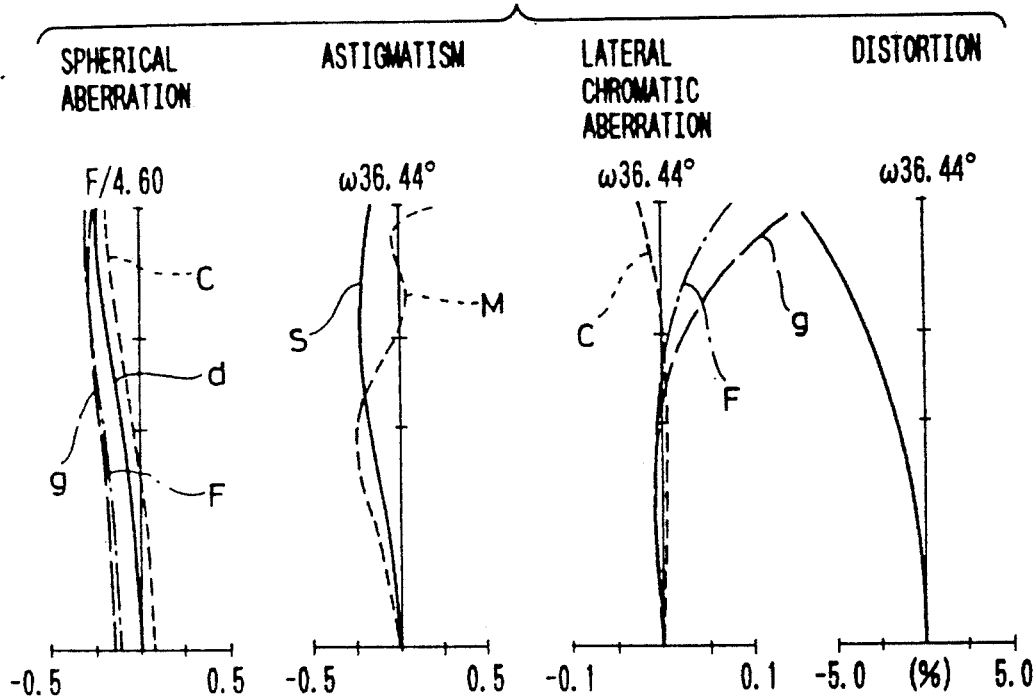
FIG. 44 shows curves illustrating aberration characteristics of the sixth embodiment for the object located at the infinite distance at the wide position thereof.
Figure 45:
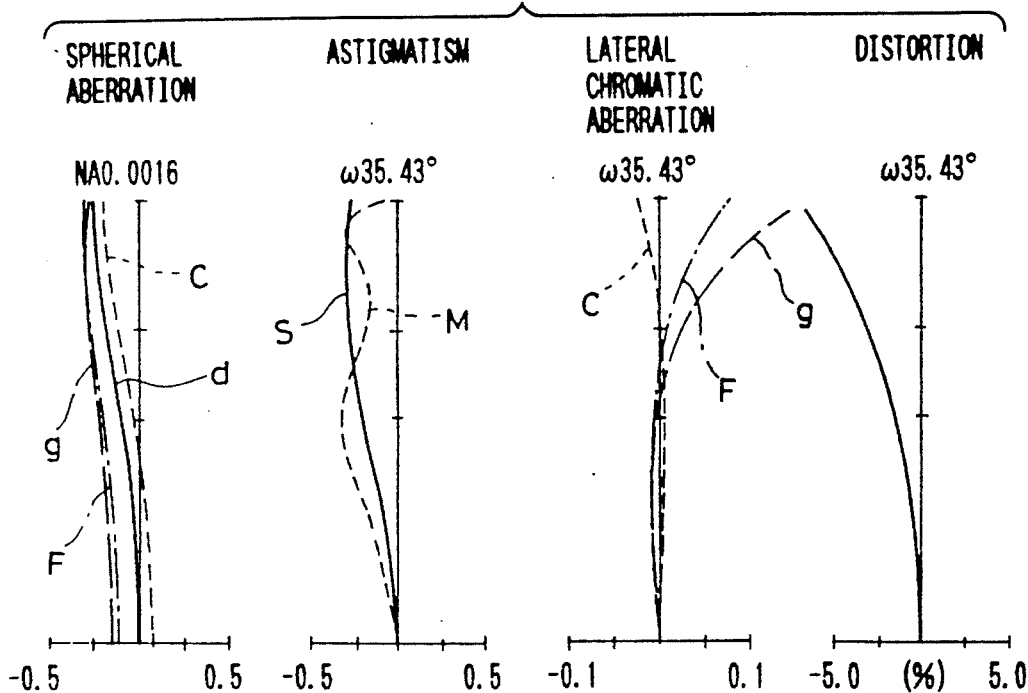
FIG. 45 shows curves illustrating aberration characteristics of the sixth embodiment for the object located at the distance of 2.0 m at the wide position thereof.
Figure 46:
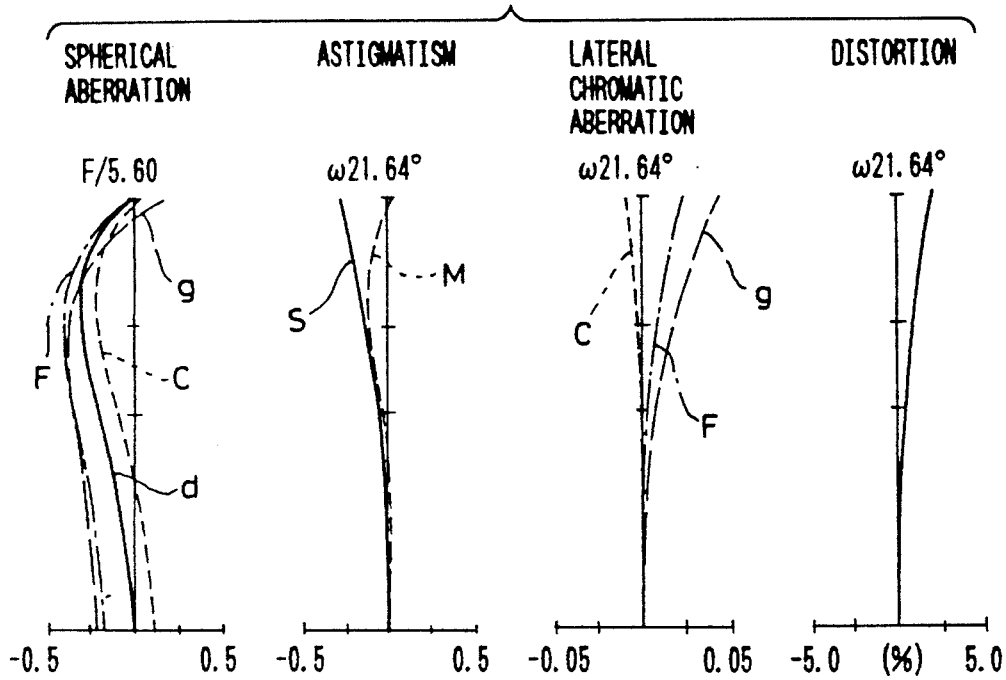
FIG. 46 shows curves illustrating aberration characteristics of the sixth embodiment for the object located at the infinite distnce at the intermediate focal length thereof.
Figure 47:
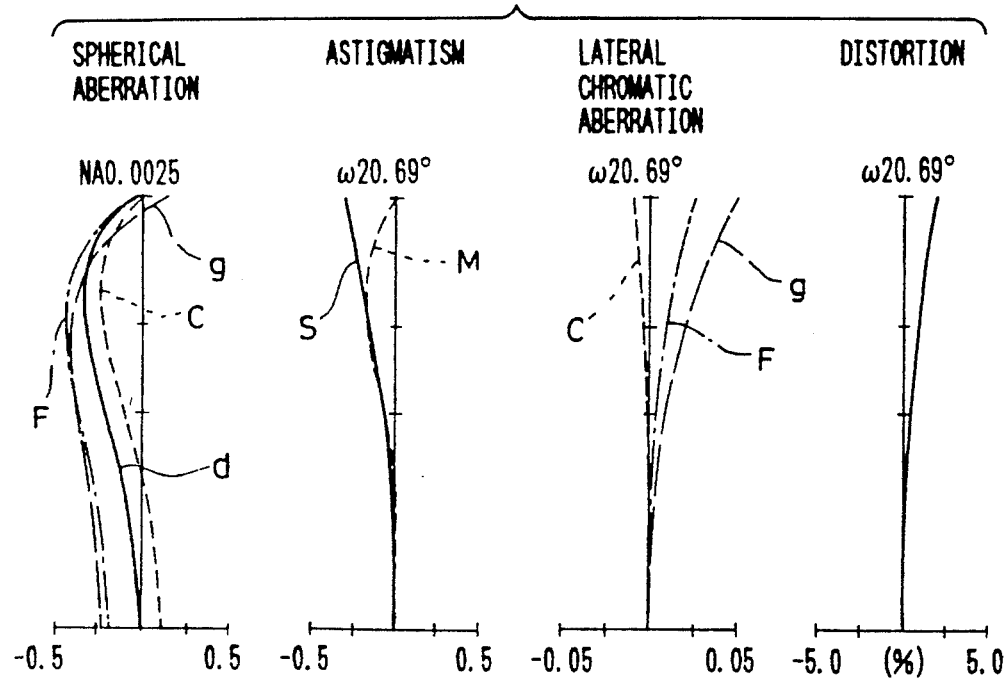
FIG. 47 shows curves illustrating aberration characteristics of the sixth embodiment for the object located at the distance of 2.0 m at the intermediate focal length thereof.
Figure 48:
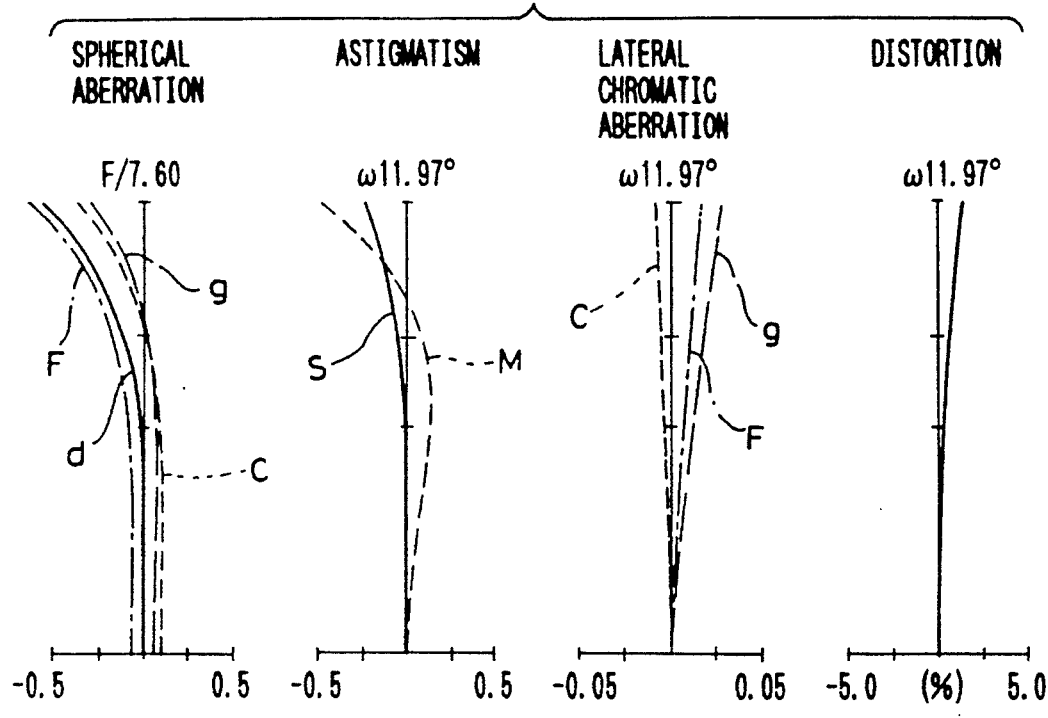
FIG. 48 shows curves illustrating aberration characteristics of the sixth embodiment for the object located at the infinite distance at the tele position thereof.
Figure 49:
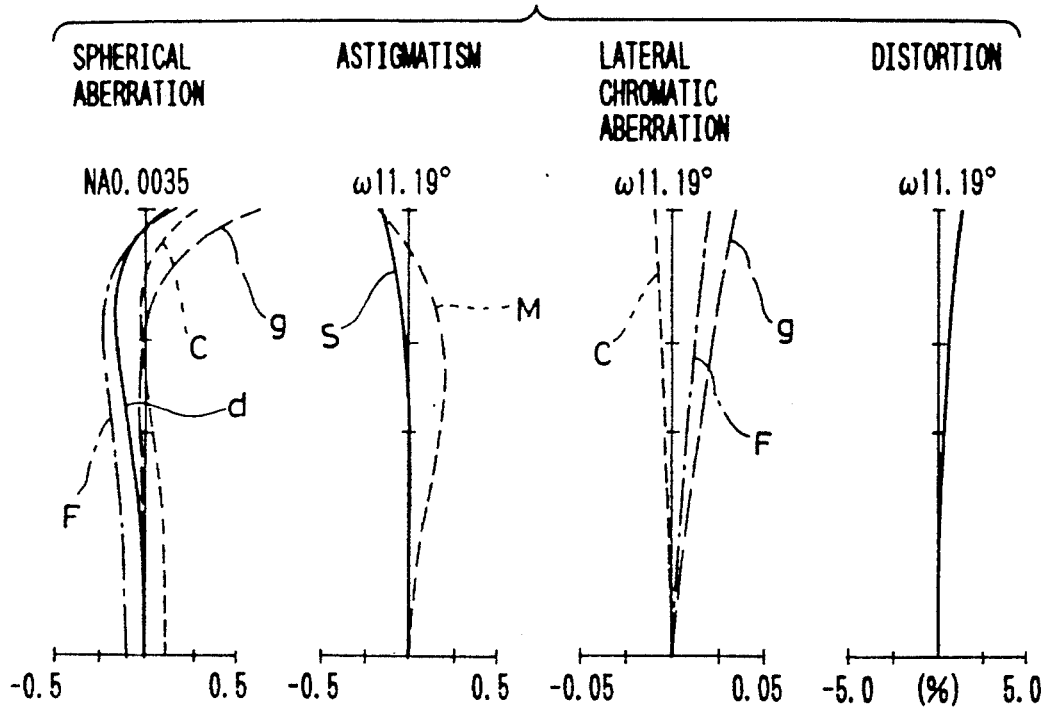
FIG. 49 shows curves illustrating aberration characteristics of the sixth embodiment for the object located at the distance of 2.0 m at the tele position thereof.

The sixth embodiment is a wide angle zoom lens system which has focal length f from 29.3 to 102 mm and a total length of 68.25 mm at the wide position thereof. The sixth embodiment has a composition illustrated in FIG. 13, wherein the first lens unit consists of a front subunit which is composed of a negative lens element and a position lens element, and a rear subunit which is composed of a negative lens element and two positive lens elements. Further, the sixth embodiment uses an aspherical surface on one of lens elements which is arranged in the third lens unit and presumed to be made of a synthetic resin material. Further, the sixth embodiment has a sufficiently long back focal length of 9.52 nun at the wide position thereof.

Aberration characteristics of the sixth embodiment are shown in FIG. 44 through FIG. 49.

Though lateral chromatic aberration of the g-line is not corrected sufficiently favorably at the wide position of the sixth embodiment which is configured so as to have a shortened total length, the sixth embodiment has aberrations corrected favorably as a whole. Further, the sixth embodiment has distortion which is varied relatively monotonously. Furthermore, astigmatism is curved in the meridional direction at the wide position under an influence due to the aspherical surface used in the third lens unit.

In addition, each of the embodiments which consists of three lens units is focused by moving the second lens unit, whereas each of the embodiments which consists of four lens units is focused by moving the second lens unit and the third lens unit.

In each of the embodiments other than the sixth embodiment, a lens component is arranged, at a most image side location in the focusing lens unit or units, for correcting variations of aberrations caused by focusing the zoom lens system on an object located at a short distance, and the focusing and correction of the aberrations are performed by moving the lens components other than the lens component mentioned above which are arranged in the focusing lens unit or units.

The aspherical surfaces used in the embodiments described above have shapes which are expressed by the formula shown below:

$$x = \frac{y^2/r}{1 + \sqrt{1 - p(y/r)^2}} + Ey^4 + Fy^6 + Gy^8 + Hy^{10} + \ldots$$

wherein a direction of the optical axis is taken as the x axis, a direction perpendicular to the optical axis is taken as the y axis, the reference symbol r represents a radius of curvature as measured in the vicinity of a vertex of the aspherical surface, and the reference symbol p designates a conical coefficient, and the reference symbols E, F, G, H, ... denote aspherical surface coefficients.

The wide angle zoom lens system according to the present invention is characterized in the composition of the first lens unit which makes it possible to widen a field angle of a zoom lens system, which can conventionally be widened hardly without prolonging a total length and outside diameter thereof, while maintaining favorable optical performance thereof.

I claim:

1. A wide angle zoom lens system comprising, in order from the object side: a first lens unit having positive refractive power, a second lens unit having positive refractive power, and a third lens unit having negative refractive power wherein focal length is varied by varying airspaces reserved between said lens units, and wherein said first lens unit consists of a front subunit and a rear subunit, and said first lens unit satisfies the following condition ( 1 ):

$$|\phi_f/\phi_1| < 6.0 \tag{1}$$

wherein the reference symbol $\phi_1$ represent refractive power of said first lens unit and the reference symbol $\phi_f$ designates refractive power of said front subunit.

2. A wide angle zoom lens system according to claim 1 wherein the front subunit of said first lens unit consists of a negative lens component.

3. A wide angle zoom lens system according to claim 1 wherein the front subunit of said first lens unit comprises a negative lens component.

4. A wide angle zoom lens system according to claim 3 wherein said first lens unit comprises a negative lens component and a positive lens component.

5. A wide angle zoom lens system according to claim 2 wherein said negative lens component is a negative meniscus lens component.

6. A wide angle zoom lens system according to claim 1 or 2 wherein an aperture stop is arranged between a lens component arranged at a most object side location in said second lens unit and a lens component arranged at a most image side location in said second lens unit.

7. A wide angle zoom lens system according to claim 1, 2 or 4 wherein said rear subunit comprises a positive lens component and a negative lens component.

8. A wide angle zoom lens system according to claim 1 wherein said first lens unit satisfies the following condition (2):

$$0.1 < \phi_1/\phi_W < 1.25 \quad (2)$$

wherein the reference symbol $\phi_W$ represents refractive power of said zoom lens system as a whole at a wide position thereof.

9. A wide angle zoom lens system according to claim 1 wherein said first lens unit and said second lens unit satisfy the following condition (3):

$$1.1 < \phi_{12W}/\phi_W < 3.0 \quad (3)$$

wherein the reference symbol $\phi_W$ represents refractive power of said zoom lens system as a whole at the wide position, and the reference symbol $\phi_{12W}$ designates total refractive power of said first lens unit and said second lens unit at the wide position.

10. A wide angle zoom lens system according to claim 1 wherein said third lens unit satisfies the following condition (4):

$$1.5 < \beta_{3T}/\beta_{3W} < (4)$$

wherein the reference symbols $\beta_{3W}$ and $\beta_{3T}$ represent magnifications of said third lens unit at a wide position and a tele position respectively of said zoom lens system.

11. A wide angle zoom lens system according to claim 1 satisfying the following condition (5):

$$0.5 < h_B/h_F < 1.5 \quad (5)$$

wherein the reference symbol $h_F$ represents height of an axial ray, as considered according to the paraxial theory, which is incident on the front subunit of said first lens unit and the reference symbol $h_B$ designates height of the axial ray which is incident on the rear subunit of said first lens unit.

12. A wide angle zoom lens system according to claim 1 satisfying the following condition (6):

$$0.2 < AB/AF < 2.0 \quad (6)$$

wherein the reference symbol AF represents height of the offaxial ray, as considered according to the paraxial theory, which is incident on the front subunit of said first lens unit and the reference symbol AB designates height of the offaxial ray which is incident on the rear subunit of said first lens unit.

13. A wide angle zoom lens system according to claim 4 wherein said negative lens component is a negative meniscus lens component.

14. A wide angle zoom lens system according to claim 4 wherein an aperture stop is arranged between a lens component arranged at a most object side location in said second lens unit and a lens component arranged at a most image side location in said second lens unit.

15. A wide angle zoom lens system according to claim 4 wherein said rear subunit comprises a positive lens component and a negative lens component.

* * * * *